(12) United States Patent
Nagumo

(10) Patent No.: US 8,421,427 B2
(45) Date of Patent: Apr. 16, 2013

(54) REFERENCE VOLTAGE GENERATION CIRCUIT, DRIVE CIRCUIT, LIGHT EMITTING DIODE HEAD, AND IMAGE FORMING APPARATUS

(75) Inventor: Akira Nagumo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 654 days.

(21) Appl. No.: 12/222,984

(22) Filed: Aug. 21, 2008

(65) Prior Publication Data

US 2009/0066312 A1   Mar. 12, 2009

(30) Foreign Application Priority Data

Sep. 7, 2007 (JP) ................................. 2007-232849
Sep. 7, 2007 (JP) ................................. 2007-232850

(51) Int. Cl.
*G05F 1/00* (2006.01)
*G05F 3/04* (2006.01)
*G05F 3/08* (2006.01)
*G05F 3/16* (2006.01)
*G05F 3/20* (2006.01)

(52) U.S. Cl.
USPC ........................... 323/281; 323/311; 323/313

(58) Field of Classification Search .................. 323/281, 323/311, 313
See application file for complete search history.

(56) References Cited

U.S. PATENT DOCUMENTS

| | | | | |
|---|---|---|---|---|
| 3,821,627 A * | 6/1974 | Milovancevic | .................. | 363/60 |
| 4,658,201 A * | 4/1987 | Notohamiprodjo | ........... | 323/224 |
| 5,055,768 A * | 10/1991 | Plagens | .......................... | 323/368 |
| 5,221,888 A * | 6/1993 | Moody | .......................... | 323/315 |
| 5,515,263 A * | 5/1996 | Otake et al. | ...................... | 363/97 |
| 5,550,461 A * | 8/1996 | Pouzoullic | ..................... | 323/269 |
| 5,703,476 A * | 12/1997 | Merlo et al. | .................... | 323/313 |
| 5,994,884 A * | 11/1999 | Paterno | .......................... | 323/268 |
| 6,028,472 A * | 2/2000 | Nagumo | ......................... | 327/512 |
| 6,373,236 B1 * | 4/2002 | Lemay, Jr. et al. | ............... | 324/95 |
| 6,424,100 B1 * | 7/2002 | Kominami et al. | ........... | 315/307 |
| 6,800,962 B2 * | 10/2004 | Bahl et al. | ........................ | 307/52 |
| 7,750,721 B2 * | 7/2010 | Ilkov et al. | ....................... | 327/513 |
| 2001/0043057 A1 * | 11/2001 | Munck | ............................ | 323/268 |
| 2004/0245975 A1 * | 12/2004 | Tran et al. | ....................... | 323/313 |
| 2006/0055382 A1 * | 3/2006 | Cuadra et al. | ................... | 323/280 |
| 2006/0097708 A1 * | 5/2006 | Tanner et al. | ................... | 323/269 |
| 2006/0176042 A1 * | 8/2006 | Lin et al. | ......................... | 323/312 |
| 2007/0262825 A1 * | 11/2007 | Kitamura et al. | .............. | 331/185 |
| 2010/0194360 A1 * | 8/2010 | Spencer | ......................... | 323/273 |

FOREIGN PATENT DOCUMENTS

JP     10-332494      12/1998
JP     2006-159472    6/2006

* cited by examiner

*Primary Examiner* — Adolf Berhane
*Assistant Examiner* — Gary Nash
(74) *Attorney, Agent, or Firm* — Kubotera & Associates, LLC

(57) ABSTRACT

A reference voltage generation circuit for outputting a reference voltage from an input voltage includes a specific voltage output unit for outputting a specific voltage from the input voltage; a first circuit section for outputting the reference voltage with a positive temperature property from the specific voltage output from the specific voltage output unit; and a second circuit section for setting a level of the reference voltage output from the first circuit section. The specific voltage output unit is formed of a regulator circuit having a first terminal connected to a power source. The first circuit section is formed of a bi-polar transistor element connected to a second terminal of the regulator circuit. The second circuit section is formed of a resistor connected to the second terminal of the regulator circuit, a collector terminal of the bi-polar transistor element, and an emitter terminal of the bi-polar transistor element.

17 Claims, 14 Drawing Sheets

REFERENCE VOLTAGE GENERATION CIRCUIT, DRIVE CIRCUIT, LIGHT EMITTING DIODE HEAD, AND IMAGE FORMING APPARATUS

BACKGROUND OF THE INVENTION AND RELATED ART STATEMENT

The present invention relates to a reference voltage generation circuit for driving a group of driven elements such as, for example, an array of light emitting diodes (LEDs) disposed in an electro-photography printer as a light source, an array of heating resistors disposed in a thermal printer, and an array of display units disposed in a display device. The present invention also relates to a drive circuit including the reference voltage generation circuit; a light emitting diode (LED) head including the drive circuit; and an image forming apparatus including the light emitting diode (LED) head.

In the specification, a light emitting diode may be referred to as an LED; a monolithic integrated circuit may be referred to as an IC (Integrated Circuit); an n-channel MOS (Metal Oxide Semiconductor) transistor may be referred to as an NMOS; and a p-channel MOS transistor may be referred to as a PMOS.

Further, a signal terminal and a signal input to or output from the signal terminal may be designated with a same reference designation. A static latent image formed on a photosensitive drum according to each of light emitting elements, or a toner image after development or transferred to a printing medium may be referred to as a dot. Each of the light emitting elements corresponding to the dot also may be referred to as a dot.

An LED head is a generic nomenclature of a unit in which a light emitting element and a drive element thereof are disposed. When the LED head is disposed only in a printer device, the LED head is referred to as an LED print head. In the following description, a group of driven elements is an array of LEDs used in an electro-photography printer as an example.

In a conventional image forming apparatus such as an electro-photography printer, a photosensitive drum charged is selectively irradiated according to print information, thereby forming a static latent image thereon. Then, toner is attached to the static latent image to form a toner image. Afterward, the toner image is transferred to a sheet, so that the toner image is developed. An LED is used as a light source. An LED head used in the conventional printer is formed of an LED array chip having a plurality of LED elements and a driver IC for driving the LED array chip.

The LED head includes a reference voltage generation circuit for generating a reference voltage, so that a drive current for driving the LED elements is determined based on the reference voltage generated from the reference voltage generation circuit and a resistor disposed in the driver IC. The resistor is produced through a semiconductor process technology. In general, the resistor is formed of poly-silicon or an impurity diffused resistor, and is integrated in the driver IC in a form of monolithic.

In the conventional electro-photography printer, the LED elements have light emission power having temperature dependence with a negative temperature coefficient. Accordingly, when a junction temperature of the LED array chip increases, the light emission power decreases.

For example, when the LED is formed of a GaAsP element, the temperature coefficient is about −0.6%/° C. When the LED is formed of an AlGaAs element, the temperature coefficient is −0.25%/° C. When the LED is formed of a GaAs element, the temperature coefficient is −1.0%/° C. Depending on a composition of a semiconductor compound or a luminescence wavelength, the temperature coefficient of the light emission power varies significantly.

As described above, the driver IC of the LED elements is disposed in the LED head. Accordingly, it is preferable that the temperature coefficient of the LED drive current value becomes positive, thereby compensating the negative temperature coefficient of the LED light emission power. The LED drive current value is determined based on the resistor disposed in the IC driver and the value of the voltage output from the reference voltage generation circuit. Accordingly, considering a temperature coefficient of the resistor (generally positive value), it is necessary to provide the voltage output from the reference voltage generation circuit with a positive temperature coefficient.

As described above, even when the temperature varies upon the LED drive, it is necessary to maintain the light emission power at a specific level. To this end, it is necessary to provide a drive method for compensating the temperature dependence of the light emission power of the LED elements. Patent Reference 1 has disclosed a circuit having such a temperature compensation circuit as explained below.

Patent Reference 1: Japanese Patent Publication No. 10-332494

FIG. 20 is a circuit diagram showing a drive circuit of the LED head of the conventional printer. FIG. 21 is a circuit diagram showing a conventional reference voltage generation circuit 37' disclosed in Patent Reference. More specifically, FIG. 20 is a circuit diagram showing a main portion of the driver IC. FIG. 20 shows a connection relationship between the LED drive circuit and a peripheral circuit thereof, and one LED element (one dot) is shown in FIG. 20.

As shown in FIG. 20, the LED drive circuit includes a pre-buffer circuit G1' indicated with a hidden line, and the pre-buffer circuit G1' is formed of an AND circuit 42', a PMOS transistor 43', and an NMOS transistor 44'. Further, the LED drive circuit includes an inverter circuit G0', a latch circuit LT1, and a control voltage generation circuit 36' indicated with a projected line. The control voltage generation circuit 36' is disposed per one driver IC chip.

An operational amplifier 51' outputs a voltage Vcont (control potential) to an LED drive transistor Tr1' for adjusting a drive current of an LED element LD1'. Further, the LED drive circuit includes a resistor 53' having a resistivity of Rref, and a PMOS transistor 52' having a gate length the same as that of the LED drive transistor Tr1'.

A reference voltage input terminal VREF is connected to an reverse input terminal of the operational amplifier 51', so that a reference voltage Vref generated at the reference voltage generation circuit (described later) is input. The operational amplifier 51', the PMOS transistor 52', and the resistor 53' constitute a feedback control circuit. A current Iref flowing through the resistor 53', that is, the PMOS transistor 52', is not depended on a power source voltage VDD, and is determined only by the reference voltage Vref and the resistivity Rref of the resistor 53'.

The operational amplifier 51' controls such that a potential of the reverse input terminal thereof becomes equal to a potential of a non-reverse input terminal thereof. Accordingly, the current Iref flowing through the resistor 53' is given by:

$$Iref = Vref / Rref$$

As described above, it is configured such that the PMOS transistor 52' has the gate length the same as that of the LED drive transistor Tr1'. A gate potential thereof becomes equal to the voltage Vcont upon driving the LED element. Accordingly, the PMOS transistor 52' and the LED drive transistor Tr1' operate in a saturated region, and have a current-mirror relationship.

As a result, a drive current value of the LED element LD1' is proportional to the current Iref flowing through the resistor 53', and the current Iref is proportional to the reference voltage Vref input into the VREF terminal. Accordingly, it is possible to collectively adjust the LED drive current according to the reference voltage Vref.

FIG. 21 is a circuit diagram showing the conventional reference voltage generation circuit 37' for generating the reference voltage Vref.

As shown in FIG. 21, PMOS transistor 61', 62', and 63' with a same size have source terminals connected to the power source VDD and gate terminals connected to each other, thereby constituting a current-mirror circuit. A drain terminal of the PMOS transistor 61' is connected to a collector terminal of an NPN bipolar transistor 64' through resistor 66' and 67' connected in series. The NPN bipolar transistor 64' has an emitter terminal connected to ground and a base terminal connected to a connection point of the resistors 66' and 67'.

A drain terminal of the PMOS transistor 62' of the current-mirror circuit is connected to a collector terminal of an NPN bipolar transistor 65'. The NPN bipolar transistor 65' has an emitter terminal connected to ground and a base terminal connected to the collector terminal of the NPN bipolar transistor 64'. A drain terminal of the PMOS transistor 63' is connected to ground through a resistor 68'.

The NPN bipolar transistor 65 has an emitter area N times larger than an emitter area of the NPN bipolar transistor 64' (N>1). A connection point of the drain terminal of the PMOS transistor 63' and the resistor 68' becomes an output terminal of the conventional reference voltage generation circuit 37' for outputting the reference voltage Vref.

As disclosed in Patent Reference 1, the conventional reference voltage generation circuit 37' shown in FIG. 21 generates an output voltage having a positive temperature coefficient. As shown in FIG. 21, the resistors 66', 67', and 68' have resistivities of R1, R2, and R3, respectively.

In the conventional reference voltage generation circuit 37' shown in FIG. 21, it is assumed that a base current of the bipolar transistors 64' and 65' is negligibly small relative to a collector current thereof. Accordingly, the output voltage Vref of the conventional reference voltage generation circuit 37' is given by:

$$Vref=(R3/R2)\times(kT/q)\ln(N)$$

Where k is the Boltzmann constant, T is an absolute temperature, q is a charge of electron, and ln represents natural legalism.

It is supposed that a temperature coefficient Tc of the output voltage Vref is defined by:

$$Tc=(1/Vref)\times(\Delta Vref/\Delta T)$$

Accordingly, the temperature coefficient Tc of the output voltage Vref is given by 1/T, and becomes about +0.33%/° C. at a room temperature (about 300° K.).

In the LED element formed of a GaAlAs element and used in the LED head, the temperature dependence of the light emission power is about −0.25%/° C. A temperature dependence of a reference resistor disposed in the IC driver formed through a CMOS process is about +0.1%/° C.

A temperature of the LED element is about the same as a temperature of the IC driver arranged adjacent to the LED element. Further, the LED elements and the conventional reference voltage generation circuit 37' may be arranged on a ground wiring portion formed on a print circuit board, so that each of the LED elements has a similar temperature.

Accordingly, in order to compensate the reduction in the light emission power upon an increase in the temperature of the LED elements, it is suffice that the reference voltage Vref has the following temperature coefficient:

$$-(-0.25-0.1)=+0.35\%/°\ C.$$

The temperature coefficient thus obtained is about the same as the temperature coefficient of the conventional reference voltage generation circuit 37'.

Patent Reference 2 has disclosed another conventional reference voltage generation circuit 38'. FIG. 22 is a circuit diagram showing the conventional reference voltage generation circuit 38'.

Patent Reference 2: Japanese Patent Publication No. 2006-159472

As shown in FIG. 22, the conventional reference voltage generation circuit 38 includes a regulator circuit 71', diodes 72' and 73', and resistors 74' and 75'. A first terminal of the regulator circuit 71' is a power source terminal connected to the power source VDD. Further, a second terminal of the regulator circuit 71' is an output terminal connected to an anode terminal of the diode 72', and a third terminal of the regulator circuit 71' is a ground terminal connected to ground.

A cathode terminal of the diode 72' is connected to an anode terminal of the diode 73'. A cathode terminal of the diode 73' is connected to one end portion of the resistor 74'. The other end portion of the resistor 74' is connected to ground through the resistor 75'. A middle connection point of the resistors 74' and 75' is connected to a reference voltage terminal Vref.

In the conventional reference voltage generation circuit 38 shown in FIG. 22, when the regulator circuit 71' has an output voltage Vo; the diodes 72' and 73' have a forward voltage Vf; and the resistors 74' and 75' have resistivities R1 and R2, a cathode voltage Vk of the diode 73' is given by:

$$Vk=Vo-2\times Vf$$

Further, the reference voltage Vref is given by:

$$Vref=R2\times Vk/(R1+R2)=R2\times(Vo-2\times Vf)/(R1+R2)$$

In the above equations, the forward voltage Vf of the diodes 72' and 73' decreases at a rate of −2 mV/° C. with an increase in a temperature. Accordingly, the reference voltage Vref increases with an increase in a temperature substantially linearly.

The resistors 74' and 75' have small temperature dependence, and the regulator circuit 71' also has small temperature dependence, thereby making it possible to ignore the temperature dependence thereof. Accordingly, in the conventional reference voltage generation circuit 38' shown in FIG. 22, a temperature coefficient Tc of the reference voltage Vref is given by:

$$Tc=1/Vref\times(\Delta Vref/\Delta VDD)=2\times(Vo-2\times Vf)/(-\Delta Vf/\Delta T)$$

As a first example, when the forward voltage Vf of the diodes 72' and 73' is 0.6 V, a temperature coefficient of the forward voltage Vf is −2 mV/° C., and the output voltage Vo of the regulator circuit 71' is 2.5 V, the temperature coefficient Tc of the reference voltage Vref is given by:

$$Tc=1/Vref\times(\Delta Vref/\Delta VDD)=2\times(2.5-2\times0.6)/(2\ mV/°\ C.)=+0.31\%/°\ C.$$

Further, the reference voltage Vref is given by:

$$Vref=2.5-2\times0.6=1.3\ V$$

As a second example, when the output voltage Vo of the regulator circuit 71' is 1.87 V, the reference voltage Vref is given by:

$$Vref = 1.87 - 2 \times 0.6 = 0.67 \text{ V}$$

Further, the temperature coefficient Tc of the reference voltage Vref is given by:

$$Tc = 2 \times (2 \text{ mV/}^\circ\text{C.})/0.67 = 0.6\%/^\circ\text{C.}$$

Accordingly, the temperature coefficient Tc in the second example becomes double of that in the first example. However, the reference voltage Vref in the second example becomes half of that in the first example.

As described above, the temperature dependence of the LED drive IC is about $-0.1\%/^\circ$C. Combining with the conventional reference voltage generation circuit 38', the temperature coefficient of the LED drive current becomes about $+0.5\%/^\circ$C., thereby being suitable for compensating a temperature of the LED elements with a temperature dependence of about $-0.5\%/^\circ$C.

As a third example, when the output voltage Vo of the regulator circuit 71' is 1.56 V, the reference voltage Vref is given by:

$$Vref = 1.56 - 2 \times 0.6 = 0.36 \text{ V}$$

Further, the temperature coefficient Tc of the reference voltage Vref is given by:

$$Tc = 2 \times (2 \text{ mV/}^\circ\text{C.})/0.36 = 1.1\%/^\circ\text{C.}$$

Accordingly, the temperature coefficient Tc in the third example becomes double of that in the second example. However, the reference voltage Vref in the third example becomes half of that in the second example.

As described above, the temperature dependence of the LED drive IC is about $-0.1\%/^\circ$C. Combining with the conventional reference voltage generation circuit 38', the temperature coefficient of the LED drive current becomes about $+1.0\%/^\circ$C., thereby being suitable for compensating a temperature of the LED elements with a temperature dependence of about $-1.0\%/^\circ$C.

In the LED head, even though the temperature varies associated with the LED rive, it is necessary to maintain the light emission power at a specific level. Accordingly, it is necessary to provide a driving method capable of compensating the temperature dependence of the light emission power of the LED elements. The LED elements tend to have various temperature dependences. Accordingly, it is necessary to provide a temperature compensation circuit with a simple configuration for obtaining a specific temperature coefficient.

In the conventional reference voltage generation circuit 37' shown in FIG. 21, it is possible to obtain only the specific temperature coefficient disproportional to the absolute temperature. Accordingly, it is difficult to use the conventional reference voltage generation circuit 37' for compensating a temperature of the LED elements with various temperature dependences.

In the conventional reference voltage generation circuit 38 shown in FIG. 22, it is possible in principle to compensate a temperature of the LED elements with temperature dependences of $-0.5\%/^\circ$C. and $-1.0\%/^\circ$C. However, when the temperature coefficient increases, the reference voltage Vref decreases to 0.67 V or 0.36 V, thereby making it difficult to obtain a desirable reference voltage for the driver IC.

Alternatively, it is possible to increase a connection stage of the diodes in the series connection to three or four stages from the two stages in the conventional reference voltage generation circuit 38' shown in FIG. 22. In this case, it is necessary to increase the number of the diodes, thereby increasing cost.

Further, it is also possible to increase the output voltage Vo of the regulator circuit 71'. However, when the output voltage Vo of the regulator circuit 71' becomes close to the power source voltage of the power source VDD, it is difficult to obtain a desired property of the regulator circuit 71'. Further, when the output voltage Vo of the regulator circuit 71' exceeds the power source voltage of the power source VDD, it is not practical.

In view of the problems described above, an object of the present invention is to provide a reference voltage generation circuit for compensating negative temperature dependence of light emitting power of an LED element and temperature dependence of a reference resistor in a driver IC. In the reference voltage generation circuit, it is possible to set an arbitrary temperature coefficient and an arbitrary output voltage. Another object of the present invention is to provide a drive circuit, a print head, and an image forming apparatus having the reference voltage generation circuit.

Further objects and advantages of the invention will be apparent from the following description of the invention.

SUMMARY OF THE INVENTION

In order to attain the objects described above, according to a first aspect of the present invention, a reference voltage generation circuit for outputting a reference voltage from an input voltage includes a specific voltage output unit for outputting a specific voltage from the input voltage; a first circuit section for outputting the reference voltage with a positive temperature property from the specific voltage output from the specific voltage output unit; and a second circuit section for setting a level of the reference voltage output from the first circuit section.

According to a second aspect of the present invention, in the reference voltage generation circuit in the first aspect of the present invention, the specific voltage output unit may be formed of a regulator circuit having a first terminal connected to a power source. The first circuit section may be formed of a bi-polar transistor element connected to a second terminal of the regulator circuit. The second circuit section may be formed of a resistor connected to the second terminal of the regulator circuit, a collector terminal of the bi-polar transistor element, and an emitter terminal of the bi-polar transistor element.

According to a third aspect of the present invention, in the reference voltage generation circuit in the first aspect of the present invention, the specific voltage output unit may be formed of a regulator circuit having a first terminal connected to a power source. The first circuit section may be formed of a bi-polar transistor element connected to a second terminal of the regulator circuit and a diode connected to an emitter terminal of the bi-polar transistor element. The second circuit section may be formed of a resistor connected to the second terminal of the regulator circuit, a collector terminal of the bi-polar transistor element, and an emitter terminal of the bi-polar transistor element.

According to a fourth aspect of the present invention, in the reference voltage generation circuit in the first aspect of the present invention, the specific voltage output unit may be formed of a regulator circuit having a first terminal connected to a power source. The first circuit section may be formed of a diode connected to a second terminal of the regulator circuit in a forward direction. The second circuit section may be formed of a resistor connected to a third terminal of the regulator circuit and the diode.

According to a fifth aspect of the present invention, a reference voltage generation circuit for outputting a reference voltage from an input voltage includes a specific voltage output unit for outputting a specific voltage from the input voltage; a first temperature compensation circuit section including a first circuit section for outputting a voltage with a positive temperature property from the specific voltage output from the specific voltage output unit, and a second circuit section for setting a level of the voltage output from the first circuit section; and a second temperature compensation circuit section including a third circuit section for outputting the reference voltage with a positive temperature property from an output voltage output from the first temperature compensation circuit section, and a fourth circuit section for setting a level of the reference voltage output from the third circuit section.

According to a sixth aspect of the present invention, a reference voltage generation circuit for outputting a reference voltage to adjust a drive current for driving a driven element includes a specific voltage output unit for outputting a specific voltage from an input voltage; and a compensation resistor circuit section for obtaining the reference voltage from the specific voltage output from the specific voltage output unit and for compensating a temperature dependence of the driven element.

According to a seventh aspect of the present invention, a reference voltage generation circuit for outputting a reference voltage to adjust a drive current for driving a driven element includes a specific voltage output unit for outputting a specific voltage from an input voltage; and a compensation circuit section for compensating a temperature dependence of the driven element.

According to an eighth aspect of the present invention, a drive circuit includes a reference voltage generation circuit for outputting a reference voltage from an input voltage to adjust a drive current for driving a driven element according to the reference voltage. The reference voltage generation circuit includes a specific voltage output unit for outputting a specific voltage from the input voltage; a first circuit section for outputting the reference voltage with a positive temperature property from the specific voltage output from the specific voltage output unit; and a second circuit section for setting a level of the reference voltage output from the first circuit section.

According to a ninth aspect of the present invention, a drive circuit includes a reference voltage generation circuit for outputting a reference voltage from an input voltage to adjust a drive current for driving a driven element according to the reference voltage. The reference voltage generation circuit includes a specific voltage output unit for outputting a specific voltage from an input voltage; and a compensation circuit section for compensating a temperature dependence of the driven element.

According to a tenth aspect of the present invention, a drive circuit includes a reference voltage generation circuit for outputting a reference voltage from an input voltage to adjust a drive current for driving a driven element according to the reference voltage. The reference voltage generation circuit includes a specific voltage output unit for outputting a specific voltage from an input voltage; and a compensation resistor circuit section for obtaining the reference voltage from the specific voltage output from the specific voltage output unit and for compensating a temperature dependence of the driven element.

According to an eleventh aspect of the present invention, a print head includes a reference voltage generation circuit for outputting a reference voltage from an input voltage to adjust a drive current for driving a driven element according to the reference voltage. The reference voltage generation circuit includes a specific voltage output unit for outputting a specific voltage from the input voltage; a first circuit section for outputting the reference voltage with a positive temperature property from the specific voltage output from the specific voltage output unit; and a second circuit section for setting a level of the reference voltage output from the first circuit section.

According to a twelfth aspect of the present invention, a print head includes a reference voltage generation circuit for outputting a reference voltage from an input voltage to adjust a drive current for driving a driven element according to the reference voltage. The reference voltage generation circuit includes a specific voltage output unit for outputting a specific voltage from an input voltage; and a compensation circuit section for compensating a temperature dependence of the driven element.

According to a thirteenth aspect of the present invention, a print head includes a reference voltage generation circuit for outputting a reference voltage from an input voltage to adjust a drive current for driving a driven element according to the reference voltage. The reference voltage generation circuit includes a specific voltage output unit for outputting a specific voltage from an input voltage; and a compensation resistor circuit section for obtaining the reference voltage from the specific voltage output from the specific voltage output unit and for compensating a temperature dependence of the driven element.

According to a fourteenth aspect of the present invention, an image forming apparatus includes a reference voltage generation circuit from an input voltage for outputting a reference voltage to adjust a drive current for driving a driven element according to the reference voltage. The reference voltage generation circuit includes a specific voltage output unit for outputting a specific voltage from the input voltage; a first circuit section for outputting the reference voltage with a positive temperature property from the specific voltage output from the specific voltage output unit; and a second circuit section for setting a level of the reference voltage output from the first circuit section.

According to a fifteenth aspect of the present invention, an image forming apparatus includes a reference voltage generation circuit from an input voltage for outputting a reference voltage to adjust a drive current for driving a driven element according to the reference voltage. The reference voltage generation circuit includes a specific voltage output unit for outputting a specific voltage from an input voltage; and a compensation circuit section for compensating a temperature dependence of the driven element.

According to a sixteenth aspect of the present invention, an image forming apparatus includes a reference voltage generation circuit from an input voltage for outputting a reference voltage to adjust a drive current for driving a driven element according to the reference voltage. The reference voltage generation circuit includes a specific voltage output unit for outputting a specific voltage from an input voltage; and a compensation resistor circuit section for obtaining the reference voltage from the specific voltage output from the specific voltage output unit and for compensating a temperature dependence of the driven element.

In the present invention, it is possible to set a temperature coefficient at a large level without increasing the number of components. Further, it is possible to set an arbitrary temperature coefficient and an arbitrary reference voltage.

DETAILED DESCRIPTION OF PREFERRED EMBODIMENTS

Figure 1:
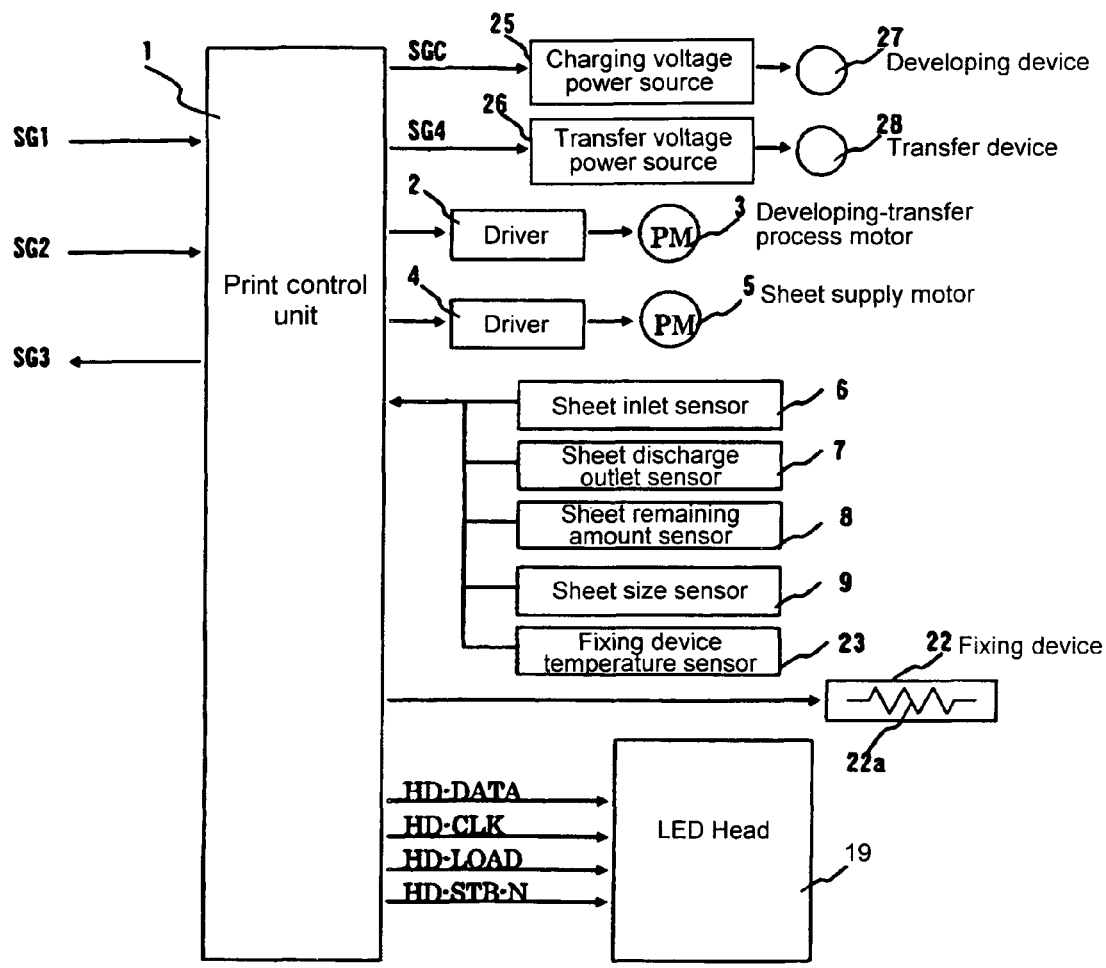
FIG. 1 is a block diagram showing a configuration of an electro-photography printer according to a first embodiment of the present invention.

Hereunder, preferred embodiments of the present invention will be explained with reference to the accompanying drawings. Similar components in the drawings are designated with the same reference numerals.

First Embodiment

Figure 2:
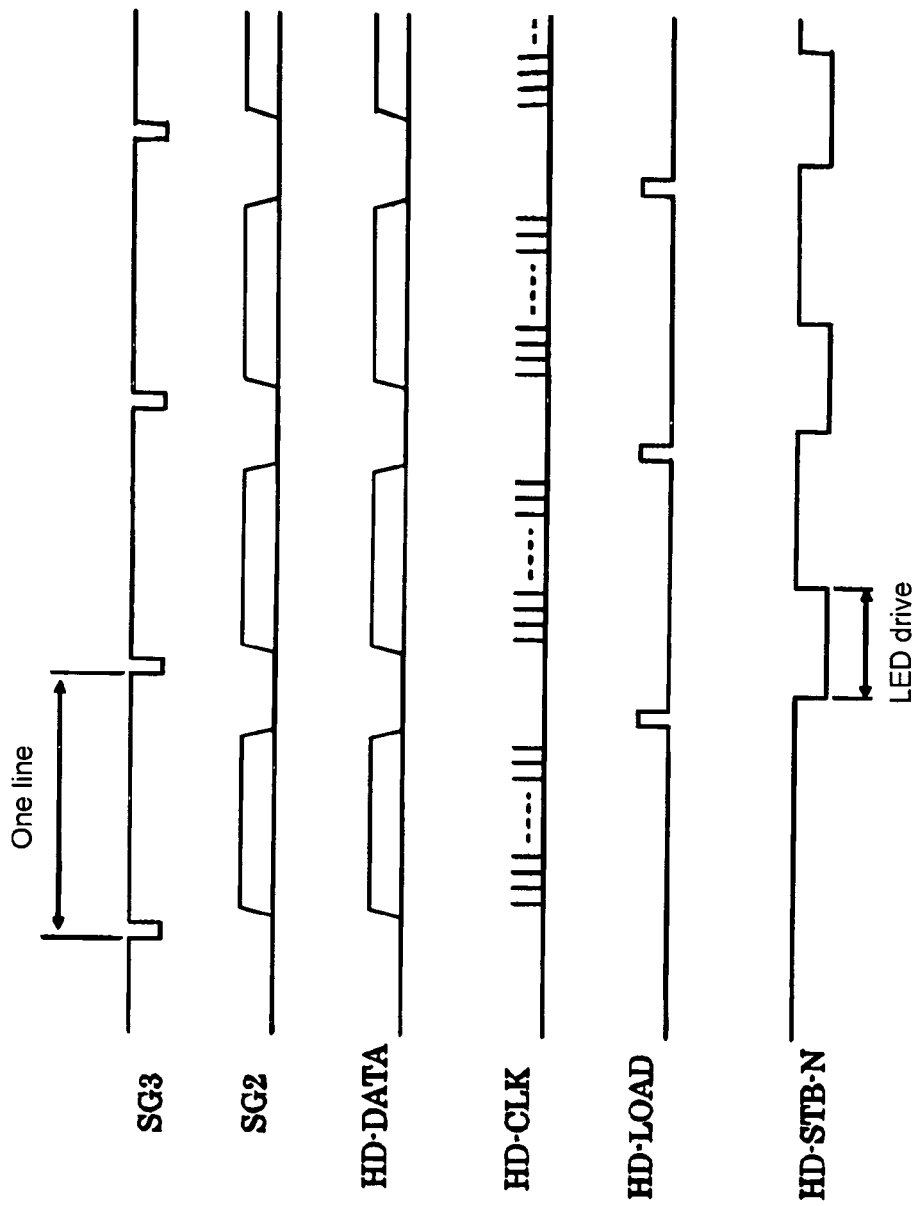
FIG. 2 is a time chart showing an operation of the electro-photography printer according to the first embodiment of the present invention.

A first embodiment of the present invention will be explained. FIG. 1 is a block diagram showing a configuration of an electro-photography printer according to the first embodiment of the present invention. FIG. 2 is a time chart showing an operation of the electro-photography printer according to the first embodiment of the present invention.

As shown in FIG. 1, the electro-photography printer includes a print control unit 1 formed of a microprocessor, an RAM, an ROM, an input-output port, a timer, and the likes. The print control unit 1 is disposed in a printing unit of the electro-photography printer for performing a sequence control of an entire portion of the electro-photography printer and a printing operation according to a control signal SG1, a video signal SG2 (in which dot map data are arranged one-dimensionally), and the likes from an upper controller (not shown).

When the print control unit 1 receives a print direction along with the control signal SG1, the print control unit 1 first detects whether a fixing device 22 with a heater 22a disposed therein is within an operatable temperature range using a fixing device temperature sensor 23. When the fixing device 22 is not within the operatable temperature range, the print control unit 1 energizes the heater 22a to heat the fixing device 22 up to an operatable temperature.

In the next step, the print control unit 1 controls a developing-transfer process motor (PM) 3 to rotate through a driver 2. At the same time, the print control unit 1 turns on a charging voltage power source 25 with a charge signal SGC, thereby charging a developing device 27.

In the next step, a sheet remaining amount sensor 8 and a sheet size sensor 9 detects a sheet (not shown) and a size thereof, and the sheet is transported. A sheet supply motor (PM) 5 is capable of rotating in two directions through a driver 4. The sheet supply motor (PM) 5 rotates in a reverse direction to transport the sheet for a specific distance until a sheet inlet sensor 6 detects the sheet. Then, the sheet supply motor (PM) 5 rotates in a forward direction to transport the sheet into a printing mechanism in the electro-photography printer.

As shown in FIGS. 1 and 2, when the sheet reaches a printable position, the print control unit 1 sends a timing signal SG3 (including a main scanning synchronization signal and a sub scanning synchronization signal) to the upper controller, and the print control unit 1 receives the video signal SG2 from the upper controller. The upper controller edits the video signal SG2 per page. When the print control unit 1 receives the video signal SG2, the print control unit 1 sends the video signal SG2 as a print data signal HD-DATA to an LED (Light Emitting Diode) head 19. The LED head 19 is formed of a plurality of LED elements arranged therein each for printing one dot (pixel).

When the print control unit 1 receives the video signal SG2 for one line, the print control unit 1 sends a latch signal HD-LOAD to the LED head 19, so that the print data signal HD-DATA is stored in the LED head 19. Note that the print control unit 1 is capable of printing the print data signal HD-DATA stored in the LED head 19 while the print control unit 1 receives a next video signal SG2 from the upper controller. A clock signal HD-CLK is also sent to the LED head 19 for sending the print data signal HD-DATA.

In the embodiment, the video signal SG2 is sent and received per print line. Information to be printed with the LED head 19 is converted to a static latent image on a photosensitive drum (not shown) charged with a negative potential as a dot with an increased potential. In the developing device 27, toner charged with a negative potential is attracted to each dot through an electric attraction force, thereby forming a toner image.

In the next step, the sheet is transported to a transfer device 28. A transfer voltage power source 26 becomes a negative potential with a transfer signal SG4, so that the transfer device 28 transfers the toner image to the sheet passing between the photosensitive drum and the transfer device 28.

After the toner image is transferred to the sheet, the sheet abuts against the fixing device 22 with the heater 22a disposed therein, and is transported further, thereby fixing the toner image to the sheet through heat of the fixing device 22. After the toner image is fixed to the sheet, the sheet is transported further, and is discharged to outside the printer after passing through a sheet discharge outlet sensor 7.

In the embodiment, the print control unit 1 applies a voltage from the transfer voltage power source 26 to the transfer device 28 only when the sheet passes through the transfer device 28 according to detections of the sheet size sensor 9 and the sheet inlet sensor 6. After the printing operation is performed, the print control unit 1 stops the voltage from the charging voltage power source 25 to the developing device 27, and stops the developing-transfer process motor 3. Afterward, the operation described above is repeated.

Figure 3:
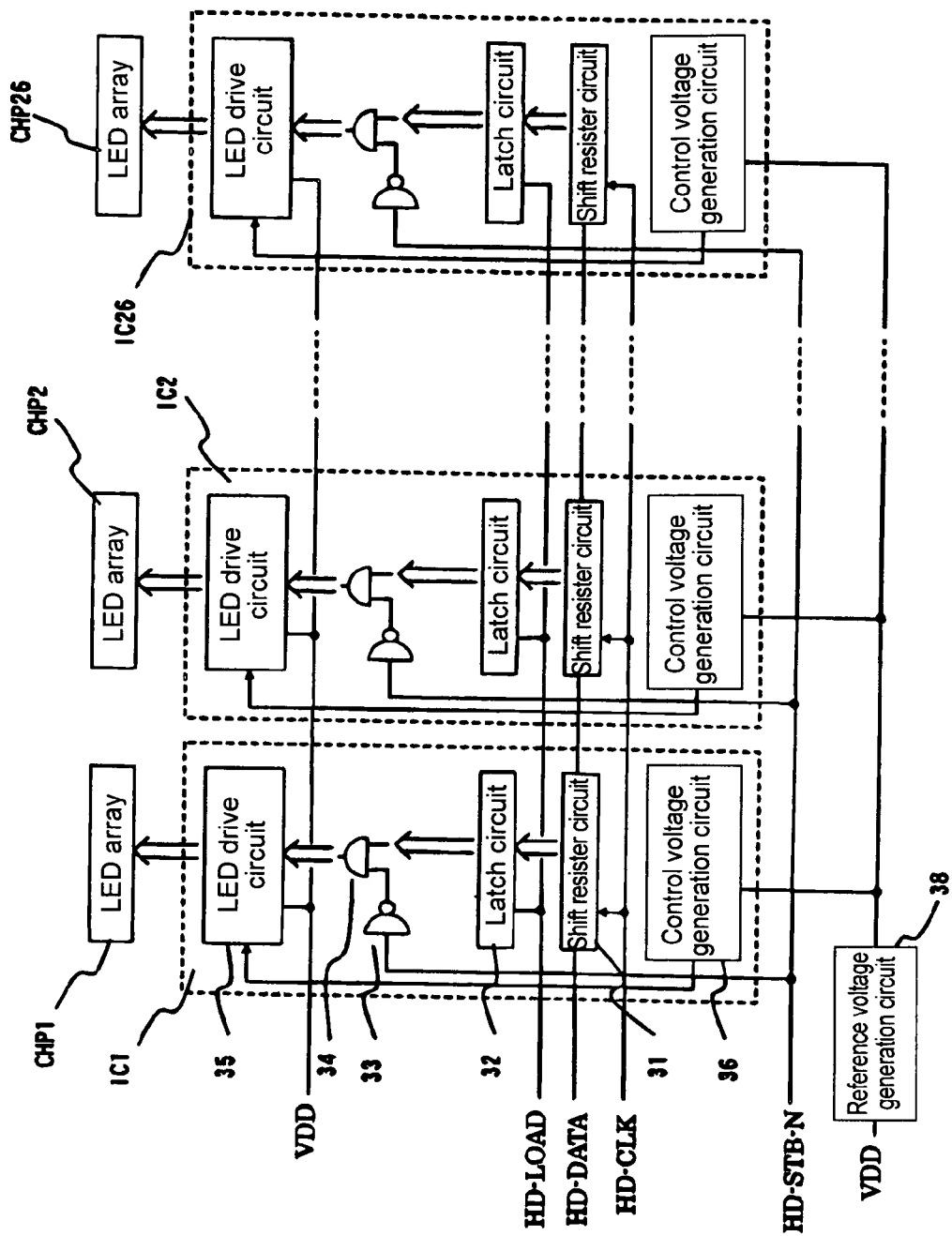
FIG. 3 is a block diagram showing a configuration of an LED (Light Emitting Diode) head according to the first embodiment of the present invention.

A configuration of the LED (Light Emitting Diode) head 19 will be explained next. FIG. 3 is a block diagram showing the configuration of the LED head 19 according to the first embodiment of the present invention.

In the following description, as an example, the LED head 19 is capable of printing on a sheet with A-4 size at a resolution of 600 dots per one inch. In the embodiment, the LED head 19 includes a total of 4992 dots of the LED elements. More specifically, the LED head 19 includes 26 of LED arrays, and each LED array is formed of 192 of the LED elements.

As shown in FIG. 3, the LED head 19 includes LED arrays CHP1 to CHP26, and LED arrays CHP3 to CHP25 are omitted in FIG. 3. Driver ICs IC1 to IC 26 are arranged to correspond to the LED arrays CHP1 to CHP26 for driving the LED arrays CHP1 to CHP26, respectively. The driver ICs IC1 to IC 26 are formed of an identical circuit, and adjacent driver ICs are connected in a cascade connection.

In the LED head 19 shown in FIG. 3, 26 of the LED arrays (CHP1 to CHP26) and 26 of the driver ICs (IC1 to IC26) for driving the LED arrays are arranged on a print circuit board (not shown) to face each other. One chip of the driver IC is capable of driving 192 of the LED elements, and 26 chips of the driver ICs are connected in a cascade connection for transmitting in serial print data input from outside.

In the embodiment, each of the driver ICs (IC1 to IC26) is formed of an identical circuit, and adjacent driver ICs are connected in a cascade connection.

In the embodiment, each of the driver ICs includes a shift resister circuit 31 for receiving the clock signal HD-CLK and performing shift transfer of print data; a latch circuit 32 for latching an output signal of the shift resister circuit 31 according to a latch signal (referred to as HD-LOAD); an AND circuit 34 for receiving outputs of the latch circuit 32 and an inverter circuit 33 to obtain a logic product; an LED drive circuit 35 for supplying a drive current from a power source VDD to the LED element (CHP1 etc.) according to an output signal of the AND circuit 34; and a control voltage generation circuit 36 for generating a control voltage, so that the drive current of the LED drive circuit 35 becomes constant. A strobe signal HD-STB-N is input to the inverter circuit 33.

Further, a reference voltage generation circuit 38 is provided such that an output terminal thereof is connected to the control voltage generation circuit 36 of each of the driver ICS IC1 to IC26 for supplying a reference voltage Vref. Note that when the printing operation is performed, the print control unit 1 sends the print data signal HD-DATA, the clock signal HD-CLK, the latch signal HD-LOAD, and the strobe signal HD-STB-N.

Figure 4:
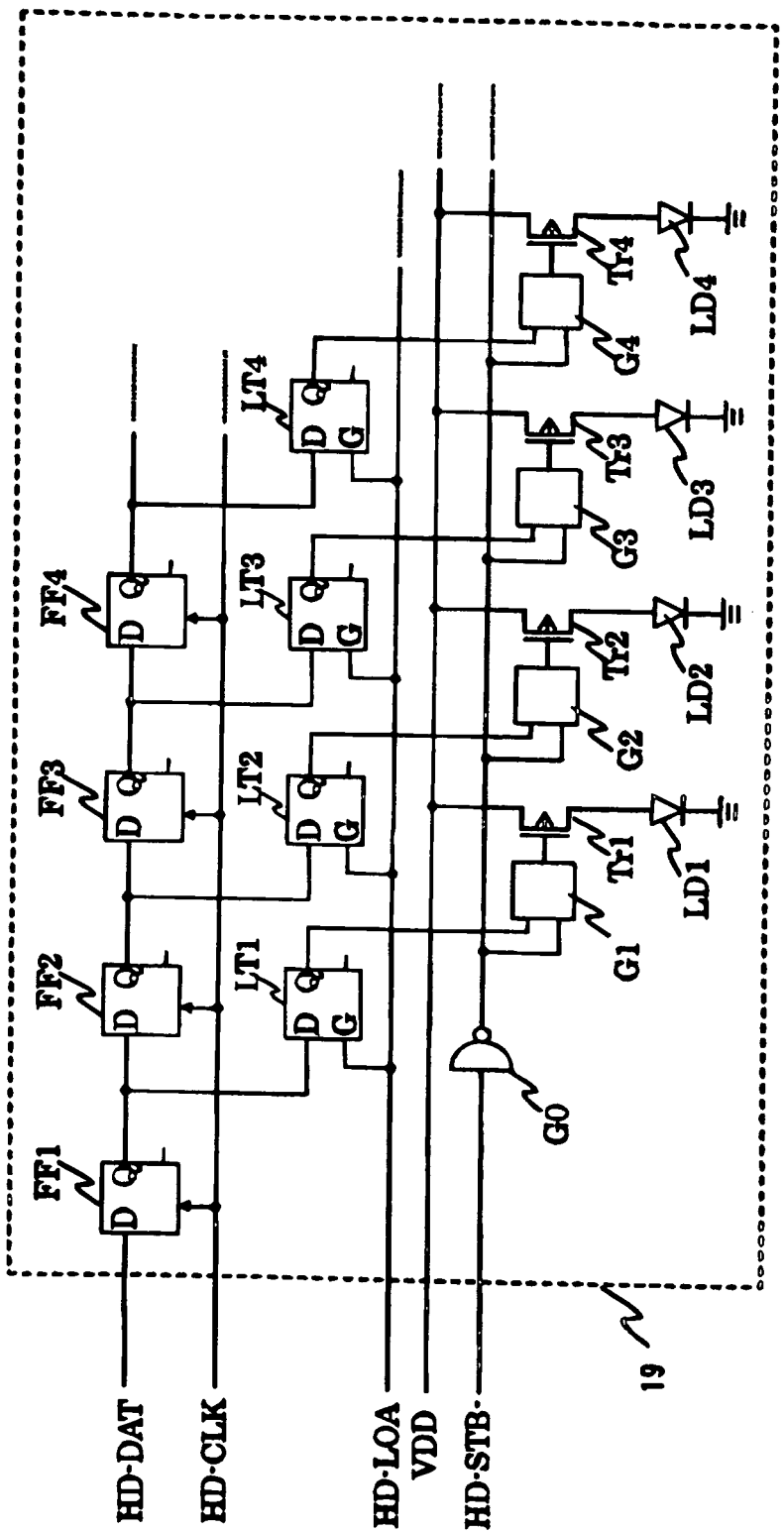
FIG. 4 is a simplified circuit diagram of the configuration of the LED head according to the first embodiment of the present invention.

FIG. 4 is a simplified circuit diagram of the configuration of the LED head shown in FIG. 3 according to the first embodiment of the present invention. As shown in FIG. 4, both the print data signal HD-DATA and the clock signal HD-CLK are input to the LED head 19. In the printer, bit data of 4992 dots are transmitted through a shift resister formed of flip-flop circuits FF1 to FF4992.

Then, the latch signal HD-LOAD is input to the LED head 19, so that the bit data are latched to latch circuits LT1 to LT4992. Afterward, ones among the LED elements LD1 to LED4992 corresponding to the dot data at a high level emit light according to the bit data and the strobe signal HD-STB-N. As shown in FIG. 4, an inverter circuit G0; pre-buffer circuits G1 to G4992; switch elements Tr1 to Tr4992; and the power source VDD are further provided.

Figure 5:
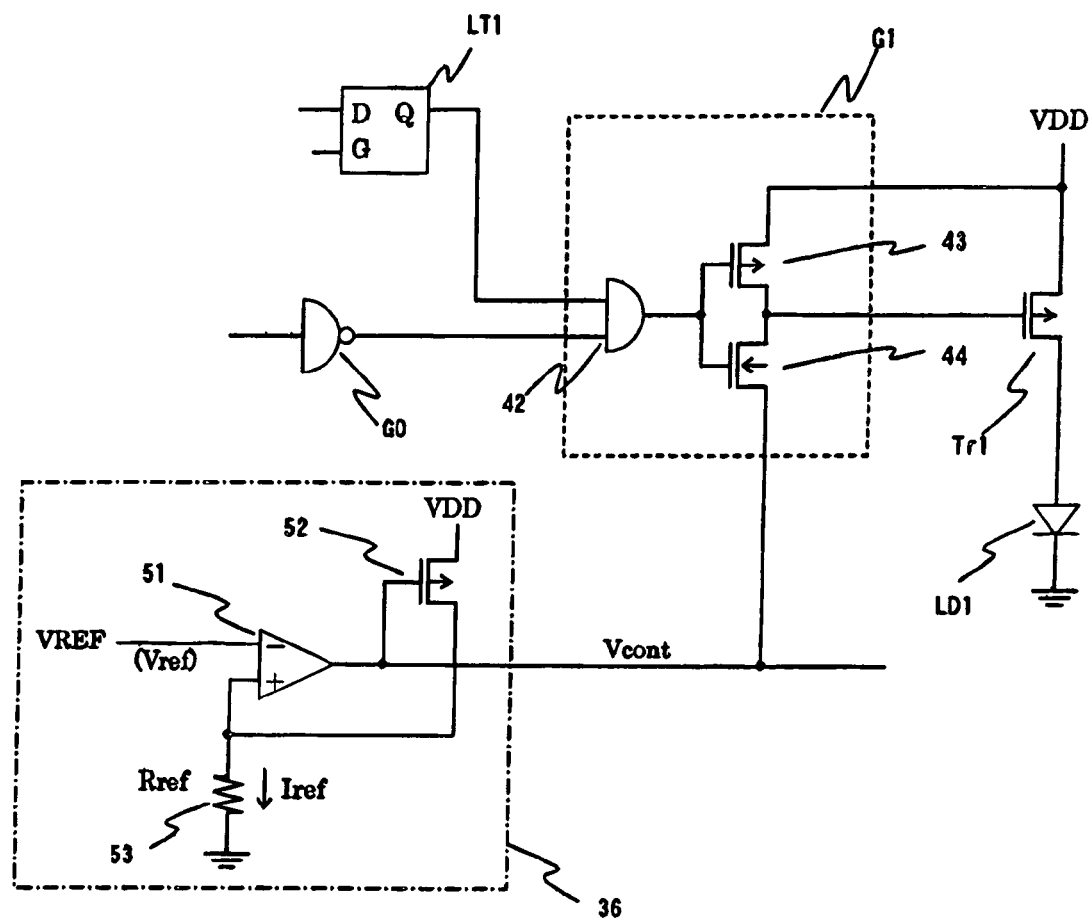
FIG. 5 is a circuit diagram showing an LED drive main portion of a driver IC (Integrated Circuit) according to the first embodiment of the present invention.

FIG. 5 is a circuit diagram showing an LED drive main portion of a driver IC (Integrated Circuit) according to the first embodiment of the present invention. A connection relationship between an LED drive circuit and a peripheral circuit thereof is shown in FIG. 5. In FIG. 5, the dot 1 (for example, a surrounding area of a drive circuit of the LED 1) is shown as an example.

As described above, the LED drive current is determined based on the reference voltage generated in the driver IC. In the following description, an operation of the driver IC will be explained.

As shown in FIG. 5, the pre-buffer circuit G1 indicated with a hidden line is formed of an AND circuit 42, a PMOS transistor 43, and an NMOS transistor 44. The inverter circuit G0 and the latch circuit LT1 are also provided. The control voltage generation circuit 36 is indicated with a projected line, and one control voltage generation circuit 36 is provided per one driver IC chip.

In the embodiment, an operational amplifier 51 outputs an output voltage Vcont to be applied to the LED drive transistor Tr1 for adjusting the drive current of the LED element. A resistor 53 has a resistivity of Rref. A PMOS transistor 52 has a gate length the same as that of the LED drive transistor Tr1.

In the embodiment, a reverse input terminal of the operational amplifier 51 is connected to a reference voltage input terminal VREF, so that the reference voltage Vref generated at the reference voltage generation circuit 38 (described later) is input thereto. Note that the operational amplifier 51, the PMOS transistor 52, and the resistor 53 constitute a feedback circuit. A current Iref flowing through the resistor 53, that is, flowing through the PMOS transistor 52, is not depended on the power source voltage VDD, and is determined only by the reference voltage Vref and the resistivity Rref of the resistor 53.

In the embodiment, the operational amplifier 51 controls such that a potential of the reverse input terminal thereof becomes equal to a potential of a non-reverse input terminal thereof. Accordingly, the current Iref flowing through the resistor 53 is given by:

$$Iref=Vref/Rref$$

As described above, it is configured such that the PMOS transistor 52 has the gate length the same as that of the LED drive transistor Tr1. A gate potential thereof becomes equal to Vcont upon driving the LED element. Accordingly, the PMOS transistor 52 and the LED drive transistor Tr1 operate in a saturated region, and have a current-mirror relationship.

As a result, the drive current value of the LED element LD1 is proportional to the current Iref flowing through the resistor 53, and the current Iref is proportional to the reference voltage Vref input into the VREF terminal. Accordingly, it is possible to collectively adjust the LED drive current according to the reference voltage Vref.

As described above, the LED head 19 is provided with the Driver ICs for driving the LED arrays. The drive current of the LED elements is determined by the resistivity Rref of the resistor 53 and the reference voltage Vref. The resistor 53 is produced through a semiconductor process technology. In general, the resistor 53 is formed of a resistor element such as poly-silicon or an impurity diffused resistor, and is integrated in the driver IC in a form of monolithic.

Figure 6:
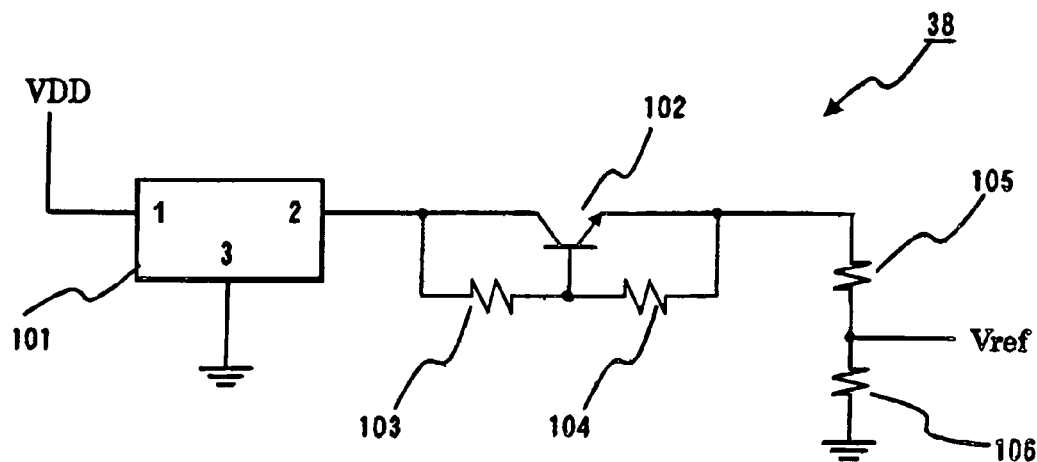
FIG. 6 is a circuit diagram showing a configuration of a reference voltage generation circuit according to the first embodiment of the present invention.

FIG. 6 is a circuit diagram showing a configuration of the reference voltage generation circuit 38 according to the first embodiment of the present invention.

As shown in FIG. 6, the reference voltage generation circuit 38 includes a regulator circuit 101; an NPN transistor 102; and resistors 103 to 106. The regulator circuit 101 has a first terminal as a power source terminal connected to a power source VDD, a second terminal as an output terminal connected to a collector terminal of the NPN transistor 102 and one end portion of the resistor 103, and a third terminal as a ground terminal connected to ground.

The other end portion of the resistor 103 is connected to a base terminal of the NPN transistor 102 and one end portion of the resistor 104. The other end portion of the resistor 104 is connected to an emitter terminal of the NPN transistor 102 and one end portion of the resistor 105. The other end portion of the resistor 105 is connected to a reference voltage terminal Vref and one end portion of the resistor 106. The other end portion of the resistor 106 is connected to ground.

In the embodiment, the regulator circuit 101 may include any type of circuits as far as the circuit is capable of obtaining a specific output voltage Vo regardless of the power source voltage VDD applied to the power source terminal. It is preferred that the output voltage Vo of the regulator circuit 101 has a temperature coefficient of substantially zero. More specifically, the regulator circuit 101 may include a CMOS voltage regulator S-817 series (a product of Seiko Instruments Ltd.). An output voltage of the CMOS voltage regulator is very small, i.e., mere 100 ppm/° C., and a consumption current thereof is also very small, i.e., a few μm. The regulator circuit 101 is not limited thereto, and may include various types.

Figure 7:
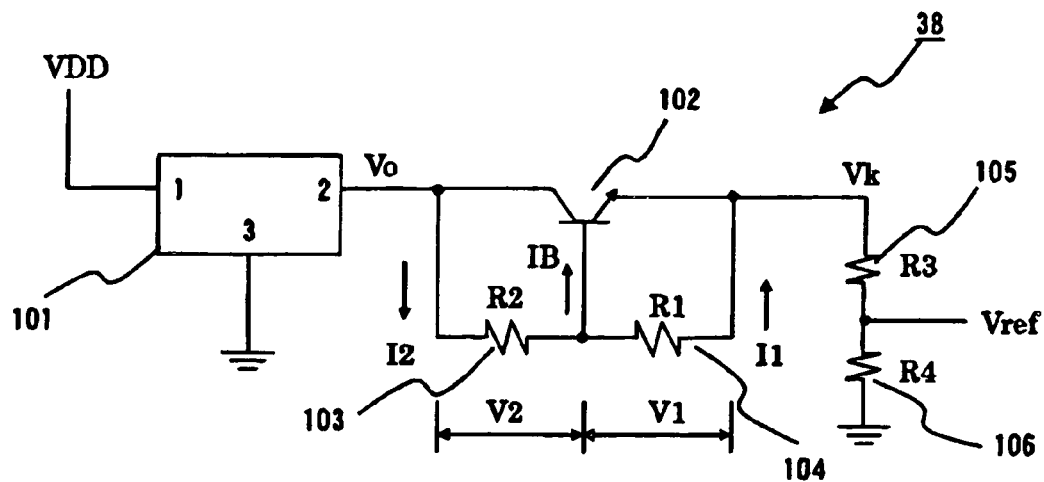
FIG. 7 is a circuit diagram showing an operation of the reference voltage generation circuit according to the first embodiment of the present invention.

An operation of the reference voltage generation circuit 38 will be explained next. FIG. 7 is a circuit diagram showing the operation of the reference voltage generation circuit 38 according to the first embodiment of the present invention. In FIG. 7, for the sake of the explanation, the resistors 103, 104, 105, and 106 have resistivities of R2, R1, R3, and R4, respectively. Further, the resistors 103 and 104 have voltages V2 and V1 at both end portions thereof, respectively. Further, currents I2 and I1 flow through the resistors 103 and 104, and a base current IB flows through the NPN transistor 102.

In the embodiment, the voltage V1 is equal to a base-emitter voltage Vbe of the NPN transistor 102. In this case, the current I1 is given by:

$$I1=Vbe/R1$$

The base current IB of the NPN transistor 102 is small and negligible. Accordingly, the current I2 flowing through the resistor 103 is given by:

$$I2=IB+I1 \approx I1$$

Further, the voltage V2 at both end portions of the resistor 103 is given by:

$$V2=R2 \times I2 \approx R2 \times I1=(R2/R1) \times Vbe$$

Accordingly, a collector-emitter voltage of the NPN transistor 102 is given by:

$$V1+V2=Vbe+(R2/R1) \times Vbe=(1+R2/R1) \times Vbe$$

As described above, the regulator circuit 101 has the output voltage Vo. Accordingly, an emitter potential Vk is given by:

$$Vk=Vo-(V2+V1)=Vo-(1+R2/R1) \times Vbe$$

Accordingly, the output voltage Vref is given by:

$$Vref=R4/(R3+R4) \times Vk=R4/(R3+R4) \times [Vo-(1+R2/R1) \times Vbe]$$

In the above equation, when a temperature increases, the base-emitter voltage Vbe of the NPN transistor 102 decreases at a rate of about −2 mV/° C. Accordingly, when a temperature increases, the output voltage Vref increases substantially linearly.

In the embodiment, the resistors 103, 104, 105, and 106 have small negligible temperature dependence, and the regulator circuit 101 has also small negligible temperature dependence. Accordingly, a temperature coefficient Tc of the reference voltage Vref of the reference voltage generation circuit 38 shown in FIG. 6 is given by:

$$Tc = (1/Vref) \times \Delta Vref/\Delta T$$
$$= (1 + R2/R1)/[(Vo - (1 + R2/R1) \times Vbe)] \times (-\Delta Vbe/\Delta T)$$

When the resistivity R1 is set to be equal to the resistivity R2, the temperature coefficient Tc is given by:

$$Tc=2/[Vo-2 \times Vbe] \times (-\Delta Vbe/\Delta T)$$

Accordingly, the temperature coefficient Tc becomes positive.

Figure 21:
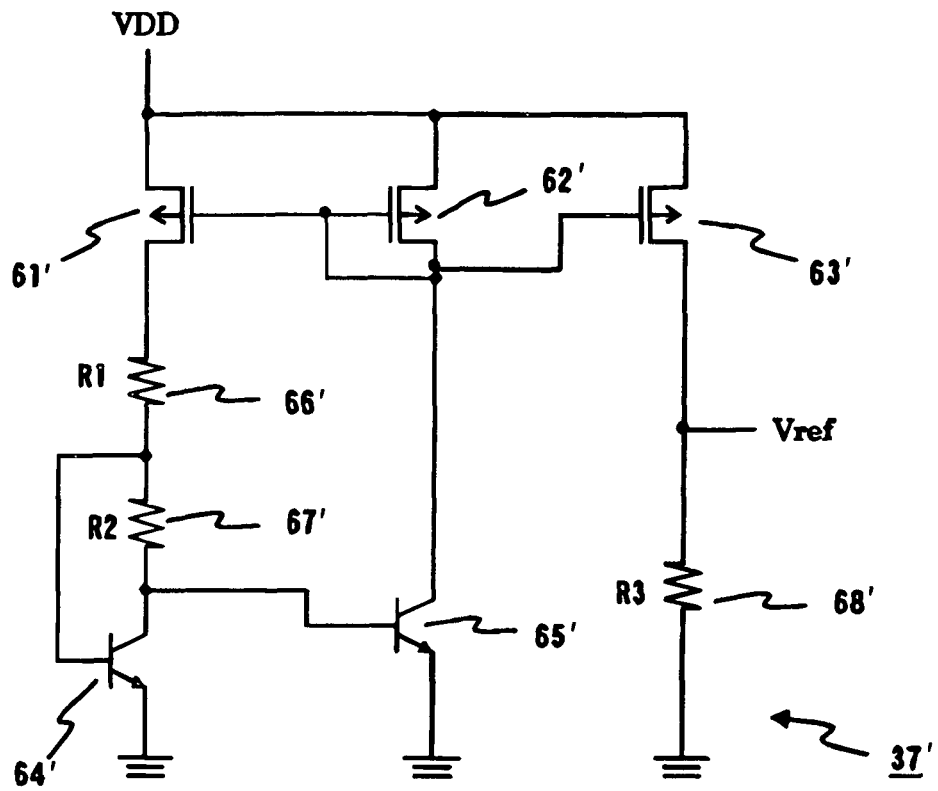
FIG. 21 is a circuit diagram showing a conventional reference voltage generation circuit.
Figure 22:
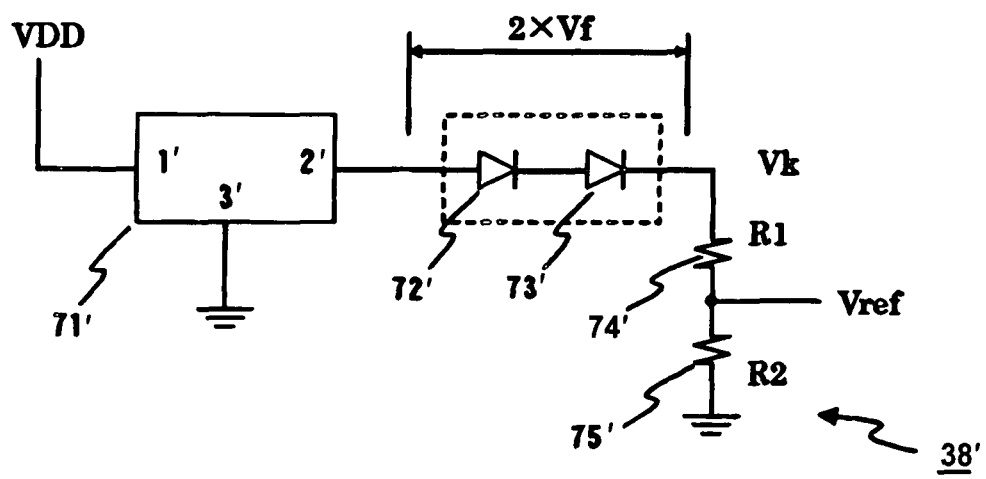
FIG. 22 is a circuit diagram showing another conventional reference voltage generation circuit.

In the embodiment, the base-emitter voltage Vbe of the NPN transistor 102 is substantially the same as a forward voltage of a diode in a conventional reference voltage generation circuit shown in FIG. 21. Further, the base-emitter voltage Vbe has temperature dependence substantially the same as that of the forward voltage.

When the resistivity R1 is set to be equal to the resistivity R2, the voltages V2 and V1 shown in FIG. 7 become equal to 2×Vbe (V2+V1=2×Vbe). Accordingly, this is equivalent to two diodes connected in series in a forward direction, thereby obtaining a property similar to that of the conventional reference voltage generation circuit shown in FIG. 21. In this case, the temperature coefficient Tc of the reference voltage Vref is given by:

$$Tc=2/(Vo-2 \times Vbe)$$

Accordingly, it is possible to obtain a property similar to that of the conventional reference voltage generation circuit shown in FIG. 21.

In another case, when a ratio of the resistivities R2/R1 is set three, the following relationship is obtained:

$$V1+V2=4\times Vbe$$

Accordingly, this is equivalent to four diodes connected in series in a forward direction. In other words, even when one single NPN transistor 102 is provided, it is possible to obtain a property similar to that in a case that four diodes are provided in the conventional reference voltage generation circuit shown in FIG. 21. Further, through setting the resistivities R1 and R2 of the resistors 104 and 103, it is possible to obtain a property equivalent to a case in which 2.5 or 2.6 of diodes are connected in series.

In the embodiment, the regulator circuit 101 disposed in the reference voltage generation circuit 38 is capable of obtaining the specific output voltage regardless of the power source voltage input thereto. The output voltage has the temperature coefficient of substantially zero. Further, it is possible to determine the reference voltage Vref of the reference voltage generation circuit 38 and the temperature coefficient of the reference voltage Vref according to the output voltage Vo of the regulator circuit 101, the temperature property of the base-emitter voltage Vbe of the NPN transistor 102, and the ratio of the resistivities of the resistors 103 and 104.

In the conventional reference voltage generation circuit shown in FIG. 21, when it is tried to increase the temperature coefficient, it is necessary to increase the number of stages of diodes connected in series, thereby increasing the number of the elements and cost. In the embodiment, on the other hand, it is not necessary to increase the number of the elements, thereby maintaining cost of an LED head low.

Further, in the embodiment, through setting the resistivities R1 and R2 of the resistors 104 and 103 of the reference voltage generation circuit 38, it is possible to obtain temperature dependence equivalent to a case in which 2.5 or 2.6 of diodes are connected in series. Accordingly, as opposed to the conventional reference voltage generation circuit, it is possible to finely set temperature compensation property, thereby achieving accurate temperature compensation of the LED.

Second Embodiment

Figure 8:
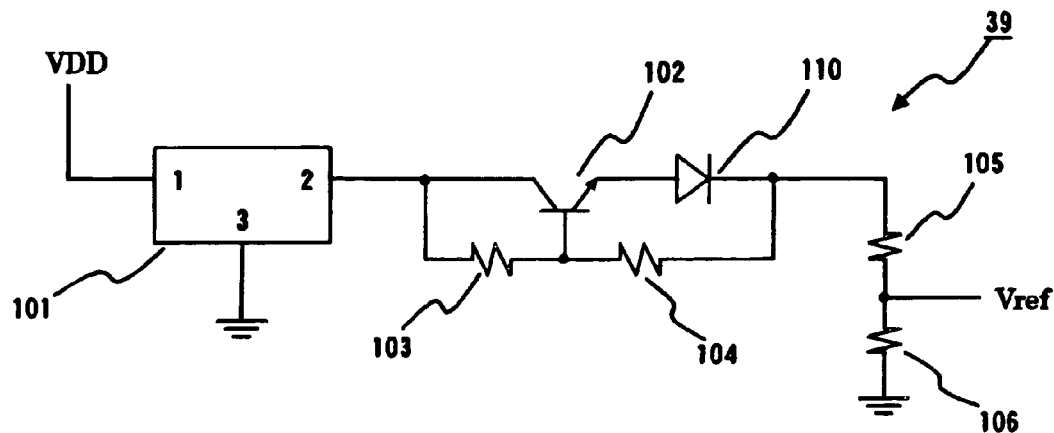
FIG. 8 is a circuit diagram showing a configuration of a reference voltage generation circuit according to a second embodiment of the present invention.

A second embodiment of the present invention will be explained next. FIG. 8 is a circuit diagram showing a configuration of a reference voltage generation circuit 39 according to the second embodiment of the present invention.

As shown in FIG. 8, the reference voltage generation circuit 39 includes the regulator circuit 101; the NPN transistor 102; a diode 110; and the resistors 103 to 106. The regulator circuit 101 has the first terminal as the power source terminal connected to the power source VDD, the second terminal as the output terminal connected to the collector terminal of the NPN transistor 102 and one end portion of the resistor 103, and the third terminal as the ground terminal connected to ground.

The other end portion of the resistor 103 is connected to the base terminal of the NPN transistor 102 and one end portion of the resistor 104. The emitter terminal of the NPN transistor 102 is connected to an node terminal of the diode 110. A cathode terminal of the diode 110 is connected to the other end portion of the resistor 104 and one end portion of the resistor 105. The other end portion of the resistor 105 is connected to the reference voltage terminal Vref and one end portion of the resistor 106. The other end portion of the resistor 106 is connected to ground.

Figure 9:
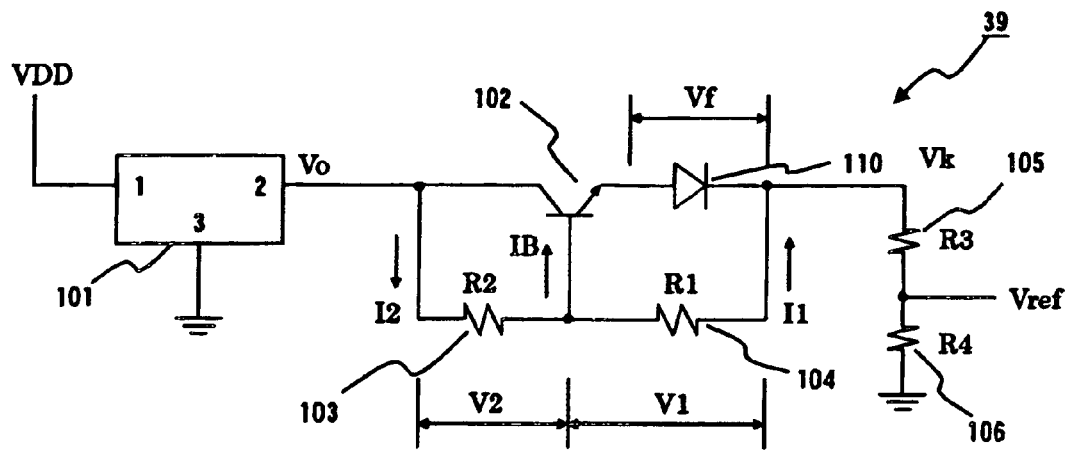
FIG. 9 is a circuit diagram showing an operation of the reference voltage generation circuit according to the second embodiment of the present invention.

An operation of the reference voltage generation circuit 39 will be explained next. FIG. 9 is a circuit diagram showing the operation of the reference voltage generation circuit 39 according to the second embodiment of the present invention. In FIG. 9, for the sake of the explanation, the resistors 103, 104, 105, and 106 have the resistivities of R2, R1, R3, and R4, respectively. Further, the resistors 103 and 104 have the voltages V2 and V1 at both end portions thereof, respectively. Further, the currents I2 and I1 flow through the resistors 103 and 104, and the base current IB flows through the NPN transistor 102.

In the embodiment, the voltage V1 is substantially equal to a sum of the base-emitter voltage Vbe of the NPN transistor 102 and a forward voltage Vf of the diode 110. Further, the base-emitter voltage Vbe of the NPN transistor 102 is substantially equal to the forward voltage Vf of the diode 110. Accordingly, the voltage V1 is given by:

$$V1=2\times Vbe$$

In this case, the current I1 flowing through the resistor 104 is given by:

$$I1=V1/R1=2\times Vbe/R1$$

The base current IB of the NPN transistor 102 is small and negligible relative to the current I2 and I1 flowing through the resistor 103 and 104. Accordingly, the current I2 flowing through the resistor 103 is given by:

$$I2=IB+I1\approx I1$$

Further, the voltage V2 at both end portions of the resistor 103 is given by:

$$V2=R2\times I2\approx R2\times I1=(R2/R1)\times 2\times Vbe$$

Accordingly, the collector-emitter voltage of the NPN transistor 102 is given by:

$$V1+V2=2\times Vbe+(R2/R1)\times 2\times Vbe=(1+R2/R1)\times 2\times Vbe$$

As described above, the regulator circuit 101 has the output voltage Vo. Accordingly, a cathode potential Vk of the diode 110 is given by:

$$Vk=Vo-(V2+V1)=Vo-(1+R2/R1)\times 2\times Vbe$$

Accordingly, the output voltage Vref is given by:

$$Vref=R4/(R3+R4)\times Vk=R4/(R3+R4)\times [Vo-(1+R2/R1)\times 2\times Vbe]$$

In the embodiment, the resistors 103, 104, 105, and 106 have small negligible temperature dependence, and the regulator circuit 101 has also small negligible temperature dependence. Accordingly, the temperature coefficient Tc of the reference voltage Vref of the reference voltage generation circuit 39 shown in FIG. 8 is given by:

$$\begin{aligned}Tc &= (1/Vref)\times \Delta Vref/\Delta T \\ &= (1+R2/R1)/[(Vo-(1+R2/R1)\times 2\times Vbe)]\times \\ &\quad (-2\times \Delta Vbe/\Delta T)\end{aligned}$$

When the resistivity R1 is set to be equal to the resistivity R2, the temperature coefficient Tc is given by:

$$Tc=4/[Vo-4\times Vbe]\times(-\Delta Vbe/\Delta T)$$

Accordingly, the temperature coefficient Tc becomes positive.

In the embodiment, the base-emitter voltage Vbe of the NPN transistor 102 is substantially the same as the forward voltage of the diode in the conventional reference voltage generation circuit shown in FIG. 21. Further, the base-emitter voltage Vbe has temperature dependence of about –2 mV/° C. substantially the same as that of the forward voltage.

When the resistivity R1 of the resistor 104 is set to be equal to the resistivity R2 of the resistor 103, the voltages V2 and V1 shown in FIG. 9 become equal to 4×Vbe (V2+V1=4×Vbe). Accordingly, this is equivalent to four diodes connected in series in a forward direction.

In another case, when the ratio of the resistivities R2/R1 is set three, the following relationship is obtained:

$$V1+V2=8\times Vbe$$

Accordingly, this is equivalent to eight diodes connected in series in a forward direction. In other words, even when one single NPN transistor 102 and one single diode 110 are provided, it is possible to obtain a property similar to that in a case that four diodes or eight diodes are provided in the conventional reference voltage generation circuit shown in FIG. 21. Further, through setting the resistivities R1 and R2 of the resistors 104 and 103, it is possible to obtain a property equivalent to a case in which 4.5 or 4.6 of diodes are connected in series.

As an actual example, it is supposed that the resistivity R1 of the resistor 104 is set to be equal to the resistivity R2 of the resistor 103. The resistivity R3 is set to zero. When the forward voltage Vf of the diode 110 is 0.6 V, the temperature coefficient of the forward voltage Vf is –2 mV/° C., and the output voltage Vo of the regulator circuit 101 is 4.0 V, the cathode potential Vk of the diode 110 is given by:

$$Vk=Vo-(1+R2/R1)\times 2\times Vbe=4-4\times Vbe=4-4\times 0.6=1.6 \text{ (V)}$$

Further, the temperature coefficient Tc of the reference voltage Vref is given by:

$$Tc=4/(Vo-4\times Vbe)\times(-\Delta Vbe/\Delta T)=4/(4-4\times 0.6)\times(2\text{ mV}/°\text{C.})=+0.5\%/°\text{ C.}$$

In general, a temperature dependence of an LED drive IC is about –0.1%/° C. Combining with the conventional reference voltage generation circuit 39, the temperature coefficient of the LED drive current becomes about +0.4%/° C., thereby being suitable for compensating a temperature of the LED elements with a temperature dependence of about –0.4%/° C.

In the embodiment, the regulator circuit 101 disposed in the reference voltage generation circuit 39 is capable of obtaining the specific output voltage regardless of the power source voltage input thereto. The output voltage has the temperature coefficient of substantially zero. Further, it is possible to determine the reference voltage Vref of the reference voltage generation circuit 38 and the temperature coefficient of the reference voltage Vref according to the output voltage Vo of the regulator circuit 101, the temperature property of the base-emitter voltage Vbe of the NPN transistor 102, and the ratio of the resistivities of the resistors 103 and 104.

In the conventional reference voltage generation circuit shown in FIG. 21, when it is tried to increase the temperature coefficient, it is necessary to increase the number of stages of diodes connected in series, thereby increasing the number of the elements and cost. In the embodiment, on the other hand, it is not necessary to increase the number of the elements, thereby maintaining cost of an LED head low.

Further, in the embodiment, through setting the resistivities R1 and R2 of the resistors 104 and 103 of the reference voltage generation circuit 39, it is possible to obtain temperature dependence equivalent to a case in which 4.5 or 4.6 of diodes are connected in series. Accordingly, as opposed to the conventional reference voltage generation circuit, it is possible to finely set temperature compensation property, thereby achieving accurate temperature compensation of the LED.

Third Embodiment

Figure 10:
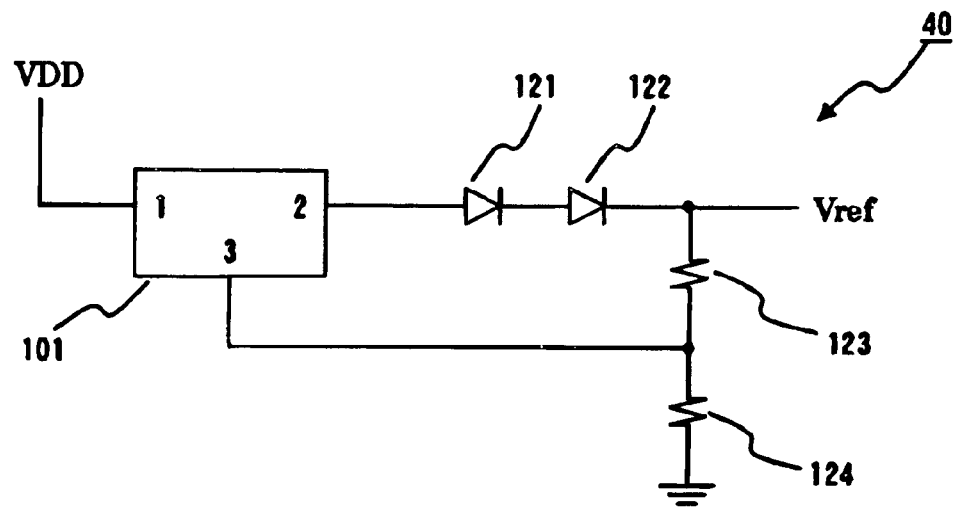
FIG. 10 is a circuit diagram showing a configuration of a reference voltage generation circuit according to a third embodiment of the present invention.

A third embodiment of the present invention will be explained next. FIG. 10 is a circuit diagram showing a configuration of a reference voltage generation circuit 40 according to the third embodiment of the present invention.

As shown in FIG. 10, the reference voltage generation circuit 40 includes the regulator circuit 101; diodes 121 and 122; and resistors 123 and 124. The regulator circuit 101 has the first terminal as the power source terminal connected to the power source VDD, the second terminal as the output terminal connected to an anode terminal of the diode 121, and the third terminal as the ground terminal connected to a middle connection point of the resistors 123 and 124.

A cathode terminal of the diode 121 is connected to an anode terminal of the diode 122. A cathode terminal of the diode 122 is connected to one end portion of the resistor 123. The other end portion of the resistor 123 is connected to one end portion of the resistor 124 and the third terminal of the regulator circuit 101. The other end portion of the resistor 124 is connected to ground.

Figure 11:
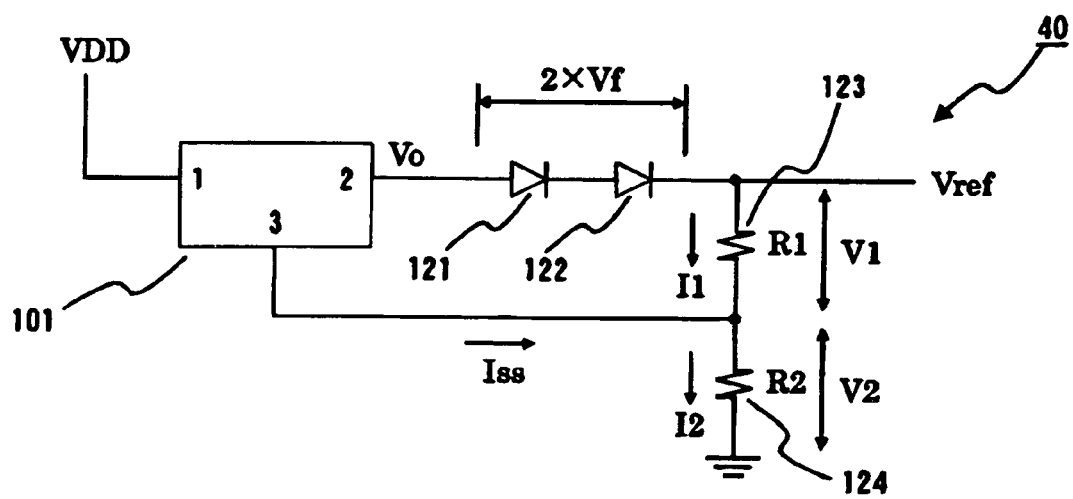
FIG. 11 is a circuit diagram showing an operation of the reference voltage generation circuit according to the third embodiment of the present invention.

An operation of the reference voltage generation circuit 40 will be explained next. FIG. 11 is a circuit diagram showing an operation of the reference voltage generation circuit 40 according to the third embodiment of the present invention. In FIG. 11, for the sake of the explanation, the resistors 123 and 124 have the resistivities of R1 and R2, respectively. Further, the resistors 123 and 124 have the voltages V1 and V2 at both end portions thereof, respectively. Further, the currents I1 and I2 flow through the resistors 123 and 124, and a ground current Iss flows through the ground terminal of the regulator circuit 101.

In the embodiment, the voltage V1 of the resistor 123 is obtained by subtracting a forward voltage Vf of the diode 122 from the output voltage Vo of the regulator circuit 101, and is given by:

$$V1=Vo-2\times Vf$$

In this case, the current I1 flowing through the resistor 123 is given by:

$$I1=V1/R1=(Vo-2\times Vf)/R1$$

The ground current Iss of the regulator circuit 101 is small and negligible relative to the currents I1 and I2 flowing through the resistor 123 and 124. Accordingly, the current I2 flowing through the resistor 124 is given by:

$$I2=Iss+I1\approx I1$$

Further, the voltage V2 at both end portions of the resistor 124 is given by:

$$V2=R2\times I2\approx R2\times I1=(Vo-2\times Vf)\times(R2/R1)$$

The reference voltage Vref is equal to a sum of the voltages V1 and V2 (Vref=V1+V2). Accordingly, the reference voltage Vref is given by:

$$Vref=(Vo-2\times Vf)+(Vo-2\times Vf)\times(R2/R1)=(1+R2/R1)\times(Vo-2\times Vf)$$

In the conventional reference voltage generation circuit shown in FIG. 21, the cathode voltage Vk of the diode 73 is given by:

$$Vk = Vo - 2 \times Vf$$

Accordingly, in the embodiment, the reference voltage Vref is larger than the cathode voltage Vk by (1+R2/R1) times.

In the embodiment, the resistors 123 and 124 have small negligible temperature dependence, and the regulator circuit 101 has also small negligible temperature dependence. Accordingly, the temperature coefficient Tc of the reference voltage Vref of the reference voltage generation circuit 40 shown in FIG. 11 is given by:

$$Tc = (1/Vref) \times \Delta Vref / \Delta T$$
$$= 2/(Vo - 2 \times Vf) \times (-\Delta Vf / \Delta T)$$

Accordingly, the temperature coefficient Tc becomes positive. Further, it is possible to adjust the temperature coefficient Tc through setting the output voltage Vo of the regulator circuit 101.

In the embodiment, as opposed to the conventional reference voltage generation circuit shown in FIG. 21, it is possible to output the reference voltage Vref larger than the cathode voltage Vk by (1+R2/R1) times. Accordingly, it is possible to set the reference voltage Vref at a specific level through changing the ratio of the resistivities independently from the temperature coefficient Tc. That is, it is possible to obtain an arbitrary output voltage and an arbitrary temperature coefficient without increasing the number of the components.

As a first actual example, it is supposed that the forward voltage Vf of the diodes 121 and 122 is 0.6 V, the temperature coefficient of the forward voltage Vf is −2 mV/° C., and the output voltage Vo of the regulator circuit 101 is 2.5 V. The resistivity R1 of the resistor 123 is set to be equal to the resistivity R2 of the resistor 124. Accordingly, the temperature coefficient Tc is given by:

$$Tc = 2/(Vo - 2 \times Vf) \times (-\Delta Vf/\Delta T) = 2/(2.5 - 2 \times 0.6) \times (2 \text{ mV}/° C.) = +0.31\%/° C.$$

At this time, the reference voltage Vref is given by:

$$Vref = (1 + R2/R1) \times (Vo - 2 \times Vf) = 2 \times (2.5 - 2 \times 0.6) = 2.6(V)$$

As a second actual example, it is supposed that the output voltage Vo of the regulator circuit 101 is 2.0 V. Accordingly, the reference voltage Vref is given by:

$$Vref = (1 + R2/R1) \times (Vo - 2 \times Vf) = 2 \times (2.0 - 2 \times 0.6) = 1.6(V)$$

At this time, the temperature coefficient Tc the reference voltage Vref is given by:

$$Tc = 2/(Vo - 2 \times Vf) \times (-\Delta Vf/\Delta T) = 2 \times (2.0 - 2 \times 0.6) \times (2 \text{ mV}/° C.) = +0.5\%/° C.$$

Accordingly, when the temperature coefficient Tc is set high, it is possible to prevent the reference voltage Vref from decreasing significantly.

As described above, in the LED head, even when a temperature varies upon the LED drive, it is necessary to maintain the light emission power at a specific level. To this end, it is necessary to provide a drive method for compensating the temperature dependence of the light emission power of the LED elements. The LED elements tend to have various temperature dependences. Accordingly, it is necessary to provide a temperature compensation circuit with a simple configuration for obtaining a specific temperature coefficient.

In the embodiment, it is possible to determine the temperature coefficient of the reference voltage Vref according to the output voltage Vo of the regulator circuit 101. As opposed to the conventional reference voltage generation circuit shown in FIG. 21, it is possible to output the reference voltage Vref increased by (1+R2/R1) times. Accordingly, it is possible to set the reference voltage Vref at a specific level through changing the ratio of the resistivities independently from the temperature coefficient Tc. That is, it is possible to obtain an arbitrary output voltage and an arbitrary temperature coefficient without increasing the number of the components.

Fourth Embodiment

Figure 12:
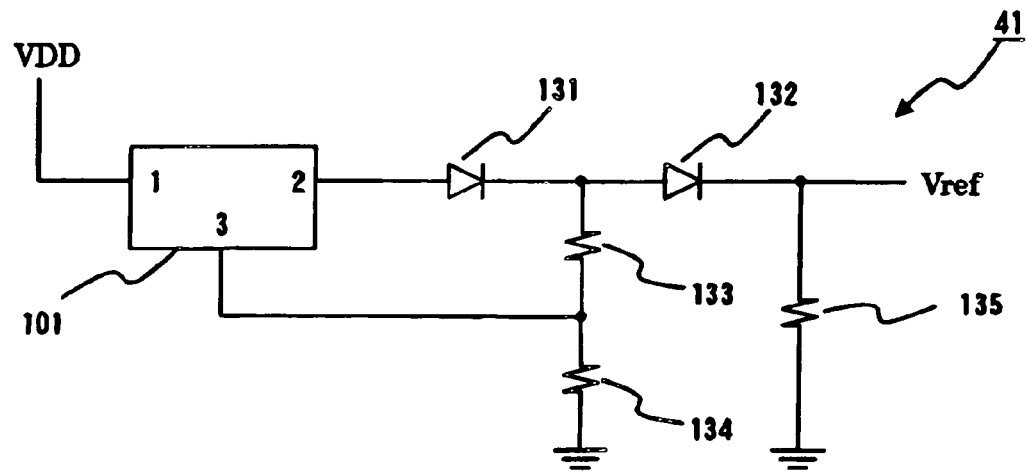
FIG. 12 is a circuit diagram showing a configuration of a reference voltage generation circuit according to a fourth embodiment of the present invention.

A fourth embodiment of the present invention will be explained next. FIG. 12 is a circuit diagram showing a configuration of a reference voltage generation circuit 41 according to the fourth embodiment of the present invention.

As shown in FIG. 12, the reference voltage generation circuit 41 includes the regulator circuit 101; diodes 131 and 132; and resistors 133 to 135. The regulator circuit 101 has the first terminal as the power source terminal connected to the power source VDD, the second terminal as the output terminal connected to an anode terminal of the diode 131, and the third terminal as the ground terminal connected to a middle connection point of the resistors 133 and 134.

A cathode terminal of the diode 131 is connected to an anode terminal of the diode 132. A cathode terminal of the diode 132 is connected to one end portion of the resistor 135. The other end portion of the resistor 135 is connected to ground. The cathode terminal of the diode 131 is connected to one end portion of the resistor 133. The other end portion of the resistor 133 is connected to the third terminal of the regulator circuit 101 and one end portion of the resistor 134. The other end portion of the resistor 134 is connected to ground.

Figure 13:
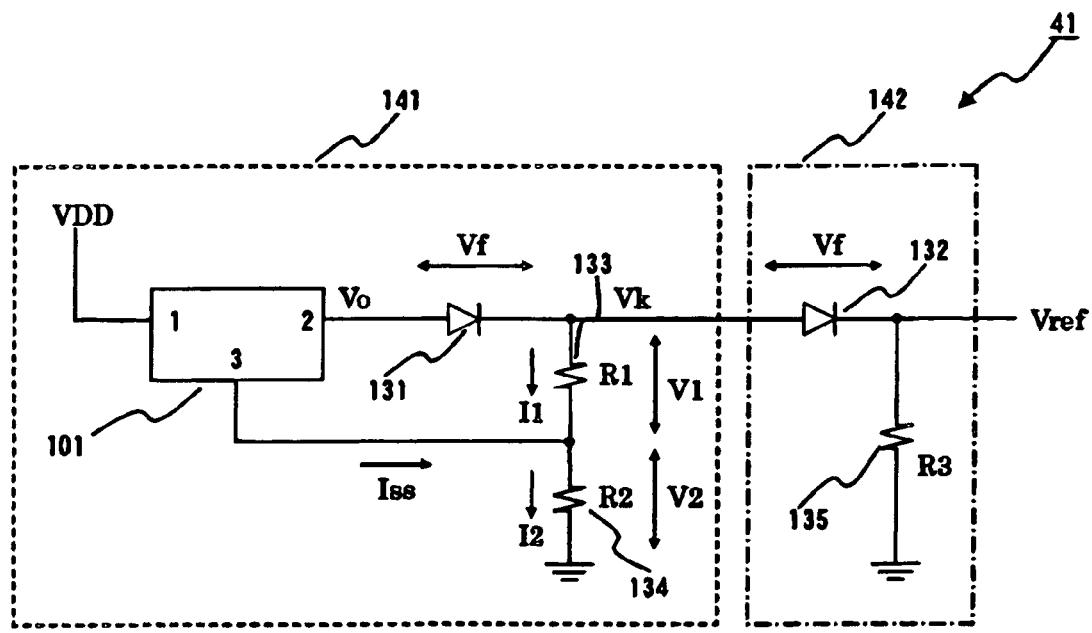
FIG. 13 is a circuit diagram showing an operation of the reference voltage generation circuit according to the fourth embodiment of the present invention.

An operation of the reference voltage generation circuit 40 will be explained next. FIG. 13 is a circuit diagram showing an operation of the reference voltage generation circuit 40 according to the third embodiment of the present invention. In FIG. 13, for the sake of the explanation, the resistors 133 and 134 have the resistivities of R1 and R2, respectively. Further, the resistors 133 and 134 have the voltages V1 and V2 at both end portions thereof, respectively. Further, the currents I1 and I2 flow through the resistors 133 and 134, and the ground current Iss flows through the ground terminal of the regulator circuit 101.

In the embodiment, the diodes 131 and 132 have the forward voltage Vf. A first temperature compensation circuit section 141 is indicated as an area surrounded with a hidden line. The first temperature compensation circuit section 141 is formed of the regulator circuit 101, the diode 131, and the resistors 133 and 134. A second temperature compensation circuit section 142 is indicated as an area surrounded with a projected line. The second temperature compensation circuit section 142 is formed of the diode 132 and the resistor 135.

In the embodiment, the voltage V1 of the resistor 133 is obtained by subtracting the forward voltage Vf of the diode 131 from the output voltage Vo of the regulator circuit 101, and is given by:

$$V1=Vo-Vf$$

In this case, the current I1 flowing through the resistor 133 is given by:

$$I1=V1/R1=(Vo-Vf)/R1$$

The ground current Iss of the regulator circuit 101 is small and negligible relative to the currents I1 and I2 flowing through the resistor 133 and 134. Accordingly, the current I2 flowing through the resistor 134 is given by:

$$I2=Iss+I1 \approx I1$$

Further, the voltage V2 at both end portions of the resistor 134 is given by:

$$V2=R2 \times I2 \approx R2 \times I1 = (Vo-Vf) \times (R2/R1)$$

The cathode potential Vk of the diode 131 is given by:

$$Vk=V1+V2=(Vo-Vf)+(Vo-Vf) \times (R2/R1)=(1+R2/R1) \times (Vo-Vf)$$

The cathode potential Vk is equal to an output voltage of the first temperature compensation circuit section 141. The reference voltage Vref is obtained by subtracting the forward voltage Vr of the diode 132 from the cathode potential Vk. Accordingly, the reference voltage Vref is given by:

$$Vref=(1+R2/R1) \times (Vo-Vf)-Vf$$

In the embodiment, the resistors 133 and 134 have small negligible temperature dependence, and the regulator circuit 101 has also small negligible temperature dependence. Accordingly, the temperature coefficient Tc of the reference voltage Vref of the reference voltage generation circuit 41 shown in FIG. 13 is given by:

$$Tc = (1/Vref) \times \Delta Vref/\Delta T$$
$$= 1/[(1+R2/R1) \times (Vo-Vf)-Vf] \times$$
$$[(1+R2/R1) \times (-\Delta Vf/\Delta T) - \Delta Vf/\Delta T]$$

When the forward voltage Vf of the diodes 131 and 132 has temperature dependence of about −2 mV/° C. Accordingly, the reference voltage generation circuit 41 has positive temperature dependence, in which the output voltage thereof increases when a temperature increases. Further, it is possible to adjust the temperature coefficient Tc through setting the output voltage Vo of the regulator circuit 101.

In the embodiment, it is possible to output the reference voltage Vref, that is the value obtained by subtracting the forward voltage Vf of the diodes from the output voltage Vo of the regulator circuit 101 and multiplied by (1+R2/R1). Accordingly, it is possible to set the output voltage at a specific level through changing the ratio of the resistivities 133 and 134 independently from the temperature coefficient Tc. Further, it is possible to obtain a large temperature coefficient by subtracting the forward voltage Vf of the diode 132 from the output voltage.

In the reference voltage generation circuit 41 shown in FIG. 13, as opposed to the conventional circuit, it is possible to obtain an arbitrary output voltage and an arbitrary temperature coefficient without increasing the number of the components.

As a first actual example, it is supposed that the forward voltage Vf of the diodes 131 and 132 is 0.6 V, the temperature coefficient of the forward voltage Vf is −2 mV/° C., and the output voltage Vo of the regulator circuit 101 is 2.5 V. The resistivity R1 of the resistor 133 is set to be equal to the resistivity R2 of the resistor 134. Accordingly, the reference voltage Vref is given by:

$$Vref=(1+R2/R1) \times (Vo-Vf)-Vf=2 \times (2.5-0.6)-0.6=3.2 \text{ (V)}$$

Further, the temperature coefficient Tc is given by:

$$Tc=+0.2\%/° C.$$

As a second actual example, it is supposed that the output voltage Vo of the regulator circuit 101 is 2.0 V. Accordingly, the reference voltage Vref is given by:

$$Vref=(1+R2/R1) \times (Vo-Vf)-Vf=2 \times (2.0-0.6)-0.6=2.2 \text{ (V)}$$

Further, the temperature coefficient Tc is given by:

$$Tc=+0.3\%/° C.$$

As a third actual example, it is supposed that the output voltage Vo of the regulator circuit 101 is 1.2 V. Accordingly, the reference voltage Vref is given by:

$$Vref=(1+R2/R1) \times (Vo-Vf)-Vf=2 \times (1.2-0.6)-0.6=0.6 \text{ (V)}$$

Further, the temperature coefficient Tc is given by:

$$Tc=+1.0\%/° C.$$

As described above, in the LED head, even when a temperature varies upon the LED drive, it is necessary to maintain the light emission power at a specific level. To this end, it is necessary to provide a drive method for compensating the temperature dependence of the light emission power of the LED elements. The LED elements tend to have various temperature dependences. Accordingly, it is necessary to provide a temperature compensation circuit with a simple configuration for obtaining a specific temperature coefficient.

In the embodiment, it is possible to determine the temperature coefficient Tc according to the output voltage Vo of the regulator circuit 101. As opposed to the conventional reference voltage generation circuit shown in FIG. 21, it is possible to output the output voltage increased by (1+R2/R1) times. Accordingly, it is possible to set the output voltage at a specific level through changing the ratio of the resistivities independently from the temperature coefficient Tc. Further, it is possible to obtain a large temperature coefficient by subtracting the forward voltage Vf of the diode 132 from the output voltage.

In the reference voltage generation circuit 41 shown in FIG. 13, as opposed to the conventional circuit, it is possible to obtain an arbitrary output voltage and a large temperature coefficient without increasing the number of the components.

Fifth Embodiment

Figure 14:
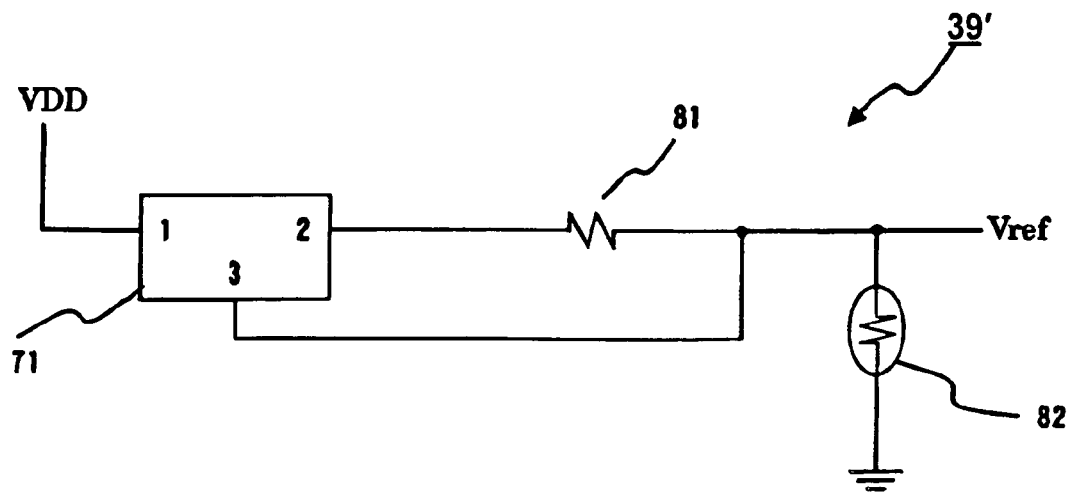
FIG. 14 is a circuit diagram showing a configuration of a reference voltage generation circuit according to a fifth embodiment of the present invention.

A fifth embodiment of the present invention will be explained next. FIG. 14 is a circuit diagram showing a configuration of a reference voltage generation circuit 39' according to the fifth embodiment of the present invention.

As shown in FIG. 14, the reference voltage generation circuit 39' includes a regulator circuit 71; a resistor 81; and a thermal sensitive resistor 82. The regulator circuit 71 has a first terminal as a power source terminal connected to the power source VDD, a second terminal as an output terminal connected to one end portion of the resistor 81, and a third terminal as a ground terminal connected to the other end portion of the resistor 81. Further, the third terminal of the regulator circuit 71 is connected to one end portion of the thermal sensitive resistor 82 and the reference voltage output terminal Vref. The other end portion of the thermal sensitive resistor 82 is connected to ground.

In the embodiment, the regulator circuit 71 may include any type of circuits as far as the circuit is capable of obtaining a specific output voltage Vo regardless of the power source voltage VDD applied to the power source terminal. It is preferred that the output voltage Vo of the regulator circuit 71 has a temperature coefficient of substantially zero. More specifically, the regulator circuit 71 may include the CMOS voltage regulator S-817 series (the product of Seiko Instruments Ltd.). The output voltage of the CMOS voltage regulator is very small, i.e., mere 100 ppm/° C., and the consumption current thereof is also very small, i.e., a few μm. The regulator circuit 71 is not limited thereto, and may include various types.

In the embodiment, the thermal sensitive resistor 82 has a resistivity with a positive temperature coefficient, so that the resistivity increases substantially linearly when an environmental temperature increases. Note that a thermistor has been generally known as an element capable of changing a resistivity thereof relative to a temperature. However, the thermistor has a resistivity with a negative temperature coefficient, so that the resistivity decreases exponentially when an environmental temperature increases. Accordingly, the thermistor may not be used in the embodiment.

In the embodiment, the thermal sensitive resistor 82 may include a rectangular plate type thermal sensitive chip resistor LP73 series, LA73 series, and LT73 series (products of KOA Corporation), or a rectangular plate type thermal sensitive chip resistor ERA series (products of Panasonic Electronic Devices Co., Ltd.). The thermal sensitive resistor 82 is formed of an alumina substrate, and a metal alloy thin film formed of platinum or titanium is formed on the alumina substrate as a temperature detection film through thin film forming technology or thick film wiring technology.

When the temperature detection film is formed of platinum, for example, the resistivity of the thermal sensitive resistor 82 increases substantially linearly when a temperature increases, and a temperature coefficient is +0.385%/° C. (refer to Japanese Industrial Standards JIS C1604). When the temperature detection film is formed of various metal alloy films, it is possible to adjust a temperature coefficient thereof. That is, through selecting an appropriate element, it is possible to obtain a desirable temperature coefficient from +0.1%/° C. to +0.5%/° C.

Figure 15:
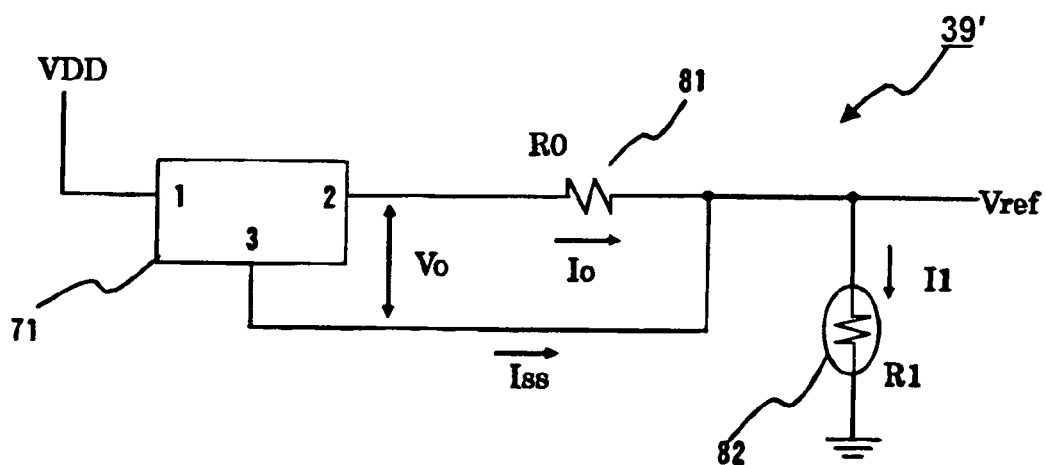
FIG. 15 is a circuit diagram showing an operation of the reference voltage generation circuit according to the fifth embodiment of the present invention.

An operation of the reference voltage generation circuit 39' will be explained next. FIG. 15 is a circuit diagram showing the operation of the reference voltage generation circuit 39' according to the fifth embodiment of the present invention. In FIG. 15, the resistors 81 and 82 have resistivities of R0 and R1, respectively. An output voltage Vo is generated between the second terminal and the third terminal of the regulator circuit 71. Further, a current Io flows through the resistor 81, a current Iss flows through the third terminal of the regulator circuit 71, and a current I1 flows through the thermal sensitive resistor 82.

In the embodiment, the current Iss is small and negligible relative to the current Io. Accordingly, the current I1 flowing through the thermal sensitive resistor 82 is given by:

$$I1 = Io + Iss \approx Io$$

Further, the current Io is given by:

$$Io = Vo/R0$$

Accordingly, the output voltage Vref of the reference voltage generation circuit 39' is given by:

$$Vref = I1 \times R1 \approx (R1/R0) \times Vo$$

In the embodiment, the resistor 81 has a temperature coefficient of substantially zero, and the output voltage of the regulator circuit 71 has a temperature coefficient of substantially zero as well. Accordingly, it is possible to obtain a temperature coefficient of the output voltage Vref substantially the same as the temperature coefficient of the thermal sensitive resistor 82.

As described above, it is possible to select the temperature coefficient of the thermal sensitive resistor 82 relatively arbitrarily. When the temperature coefficient of the thermal sensitive resistor 82 is set at +0.33%/° C., it is possible to obtain the temperature coefficient for compensating temperature dependence of an LED element formed of GaAlAs.

As described above, the regulator circuit 71 is capable of obtaining a specific output voltage Vo regardless of the power source voltage VDD applied to the power source terminal thereof, and the output voltage of the regulator circuit 71 has the temperature coefficient of substantially zero. Further, it is possible to select the temperature coefficient of the thermal sensitive resistor 82 relatively arbitrarily. When the temperature coefficient of the thermal sensitive resistor 82 is set at +0.33%/° C., it is possible to obtain the temperature coefficient for compensating temperature dependence of an LED element formed of GaAlAs.

In the conventional reference voltage generation circuit shown in FIG. 21, when it is tried to increase the temperature coefficient, it is necessary to increase the number of stages of diodes connected in series, thereby increasing the number of the elements and cost. In the embodiment, on the other hand, it is not necessary to increase the number of the elements, thereby maintaining cost of an LED head low.

Further, in the embodiment, the output voltage Vref is given by:

$$Vref \approx (R1/R0) \times Vo$$

Accordingly, when the resistivity R1 is set smaller than the resistivity R0 (R1/R0<1), it is possible to obtain the output voltage Vref smaller than the output voltage Vo of the regulator circuit 71. When the resistivity R1 is set greater than the resistivity R0 (R1/R0>1), it is possible to obtain the output voltage Vref greater than the output voltage Vo of the regulator circuit 71, thereby making it possible to set the output voltage Vref relatively freely.

Sixth Embodiment

Figure 16:
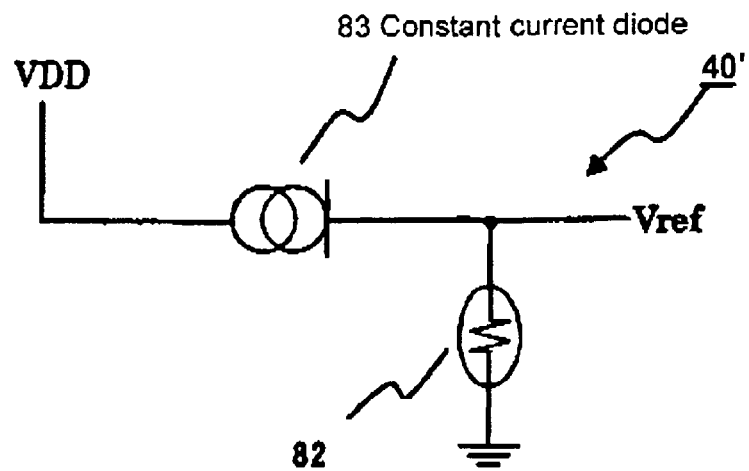
FIG. 16 is a circuit diagram showing a configuration of a reference voltage generation circuit according to a sixth embodiment of the present invention.

A sixth embodiment of the present invention will be explained next. FIG. 16 is a circuit diagram showing a configuration of a reference voltage generation circuit 40' according to the sixth embodiment of the present invention.

As shown in FIG. 16, the reference voltage generation circuit 40' includes a constant current diode 83 and the thermal sensitive resistor 82. The constant current diode 83 has a first terminal as an anode terminal connected to the power source VDD and a second terminal as a cathode terminal connected to other end portion of the thermal sensitive resistor 82. Similar to the fifth embodiment, the one end portion of the thermal sensitive resistor 82 is connected to the reference voltage output terminal Vref. The other end portion of the thermal sensitive resistor 82 is connected to ground.

In the embodiment, the constant current diode 83 may include CRD (Current Regulate Diode) series F-102 (a product of Ishizuka Electronics Corporation). In constant current diode 83, when a voltage greater than a specific level is applied between the cathode terminal and the anode terminal, a specific current flows therethrough regardless of the voltage.

Figure 17:
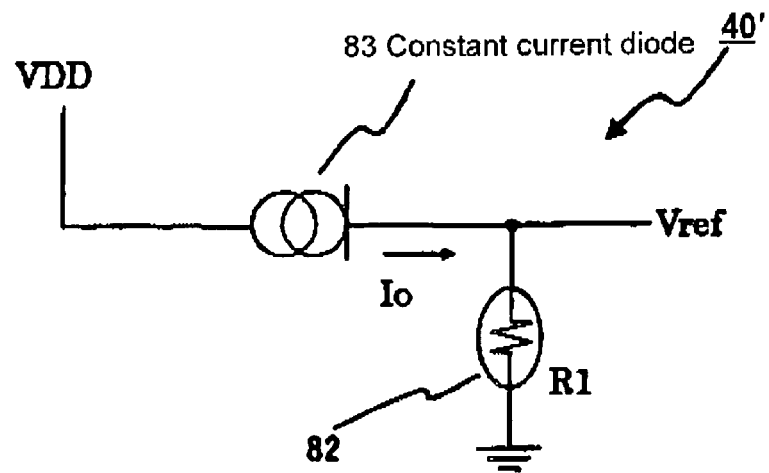
FIG. 17 is a circuit diagram showing an operation of the reference voltage generation circuit according to the sixth embodiment of the present invention.

An operation of the reference voltage generation circuit 40' will be explained next. FIG. 17 is a circuit diagram showing the operation of the reference voltage generation circuit 40' according to the fifth embodiment of the present invention. In FIG. 17, the thermal sensitive resistor 82 has a resistivity of R1. Further, a current Io flows through the constant current diode 83.

Accordingly, the output voltage Vref of the reference voltage generation circuit 40' is given by:

$$Vref = Io \times R1$$

In the embodiment, the current Io ideally has a temperature coefficient of substantially zero. It is possible to select the temperature coefficient of the thermal sensitive resistor 82 relatively arbitrarily. When the temperature coefficient of the thermal sensitive resistor 82 is set at +0.33%/° C., it is possible to obtain the temperature coefficient for compensating temperature dependence of an LED element formed of GaAlAs.

As described above, in the reference voltage generation circuit 40' in the embodiment, the constant current diode 83 is capable of obtaining a specific output current regardless of the power source voltage VDD applied to the power source terminal thereof, and the output voltage of the constant current diode 83 has the negligible temperature coefficient. Further, it is possible to select the temperature coefficient of the thermal sensitive resistor 82 relatively arbitrarily. When the temperature coefficient of the thermal sensitive resistor 82 is set at +0.33%/° C., it is possible to obtain the temperature coefficient for compensating temperature dependence of an LED element formed of GaAlAs.

In the conventional reference voltage generation circuit shown in FIG. 21, when it is tried to increase the temperature coefficient, it is necessary to increase the number of stages of diodes connected in series, thereby increasing the number of the elements and cost. In the embodiment, on the other hand, it is not necessary to increase the number of the elements, thereby maintaining cost of an LED head low.

Seventh Embodiment

Figure 18:
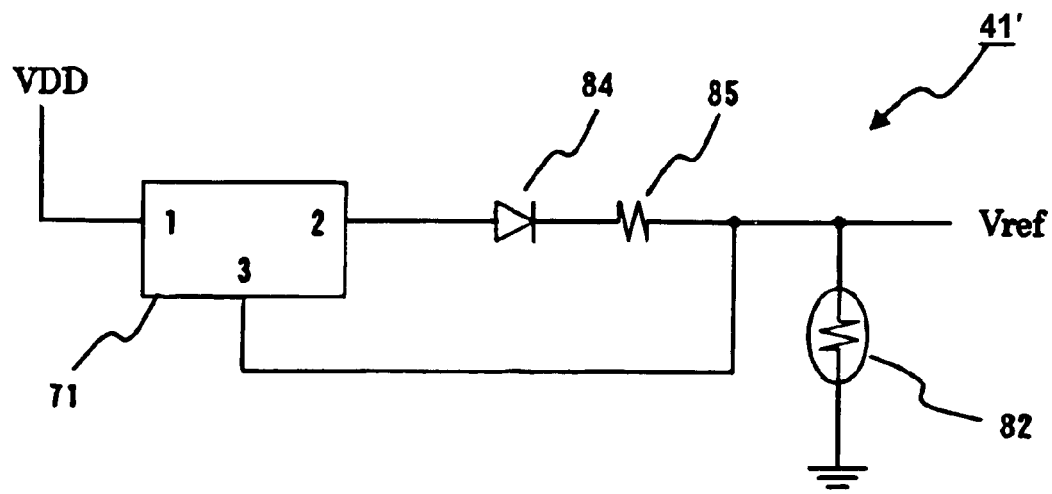
FIG. 18 is a circuit diagram showing a configuration of a reference voltage generation circuit according to a sixth embodiment of the present invention.

A seventh embodiment of the present invention will be explained next. FIG. 18 is a circuit diagram showing a configuration of a reference voltage generation circuit 41' according to the fifth embodiment of the present invention.

As shown in FIG. 18, the reference voltage generation circuit 41' includes the regulator circuit 71; a diode 84; a resistor 85; and the thermal sensitive resistor 82. The regulator circuit 71 has a first terminal as a power source terminal connected to the power source VDD, and a second terminal as an output terminal connected to an anode terminal of the diode 84.

In the embodiment, a cathode terminal of the diode 84 is connected to one end portion of the resistor 85. The other end portion of the resistor 85 is connected to the reference voltage output terminal Vref. The regulator circuit 71 has a third terminal as a ground terminal connected to the other Further, the third terminal of the regulator circuit 71 is connected to one end portion of the thermal sensitive resistor 82 and the reference voltage output terminal Vref. The other end portion of the thermal sensitive resistor 82 is connected to ground. The thermal sensitive resistor 82 has a configuration similar to that in the fifth and sixth embodiments.

Figure 19:
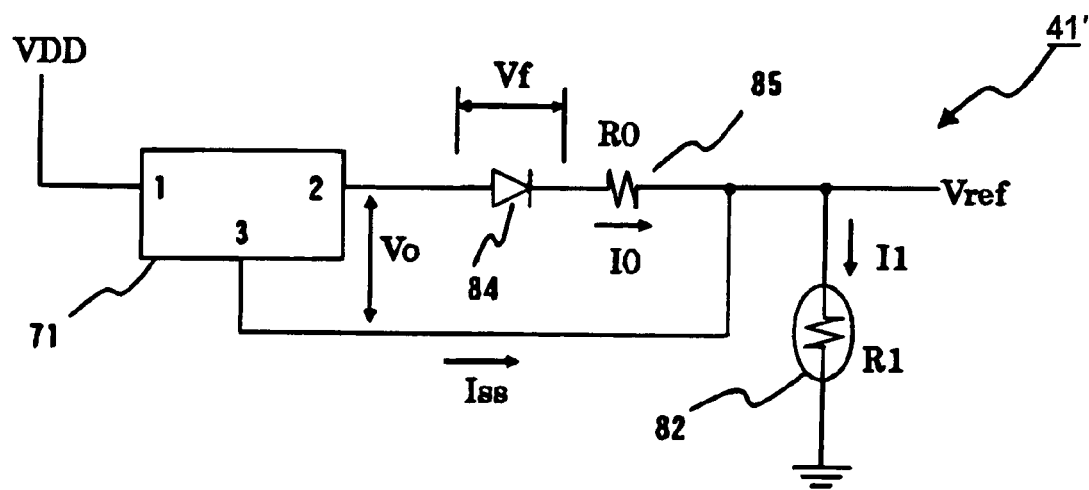
FIG. 19 is a circuit diagram showing an operation of the reference voltage generation circuit according to the sixth embodiment of the present invention.
Figure 20:
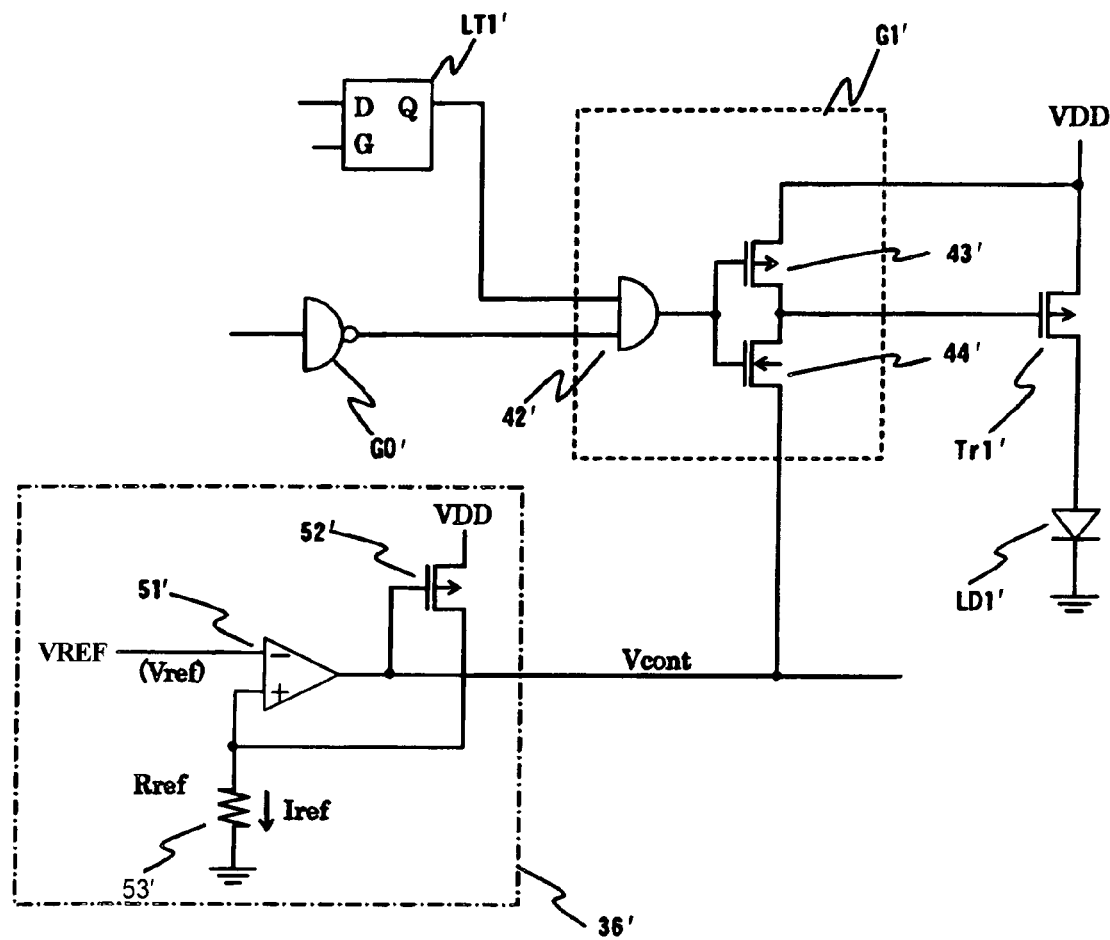
FIG. 20 is a circuit diagram showing a drive circuit of an LED head of a conventional printer.

An operation of the reference voltage generation circuit 41' will be explained next. FIG. 19 is a circuit diagram showing the operation of the reference voltage generation circuit 41' according to the fifth embodiment of the present invention. In FIG. 19, the resistor 85 has a resistivity of R0, and the thermal sensitive resistor 82 has the resistivity of R1. A forward voltage Vf is applied to the diode 84. An output voltage Vo is generated between the second terminal and the third terminal of the regulator circuit 71. Further, a current Io flows through the resistor 85, a current I1 flows through the thermal sensitive resistor 82, and a current Iss flows through the ground terminal of the regulator circuit 71.

In the embodiment, a voltage Vo−Vf is applied to both end portions of the resistor 85. Accordingly, the current IO flowing through the resistor 85 is given by:

$$IO = (Vo - Vf)/R0$$

In the embodiment, the current Iss of the regulator circuit 71 is small and negligible relative to the current Io. Accordingly, the current I1 flowing through the thermal sensitive resistor 82 is given by:

$$I1 = Io + Iss \approx Io$$

Accordingly, the output voltage Vref of the reference voltage generation circuit 41' is given by:

$$Vref = I1 \times R1 = (R1/R0) \times (Vo - Vf)$$

In the embodiment, the resistor 85 has a negligibly small temperature coefficient, and the output voltage of the regulator circuit 71 has a negligibly small temperature coefficient as well. The temperature coefficient of the output voltage Vref is equal to a product of the temperature coefficient of the thermal sensitive resistor 82 and a temperature coefficient of the voltage Vo−Vf. The forward voltage of the diode 84 has negative temperature dependence of about −2 mV/° C. Accordingly, the temperature coefficient of the voltage Vo−Vf becomes positive, so that the temperature coefficient of the output voltage Vref becomes positive and greater than the temperature coefficient of the thermal sensitive resistor 82.

In the embodiment, it is possible to adjust the temperature coefficient through changing the output voltage Vo of the regulator circuit 71. As opposed to the conventional reference voltage generation circuit shown in FIG. 21, it is possible to output the output voltage increased by (R1/R0) times from the value of subtracting the forward voltage Vf from the output voltage Vo. Accordingly, it is possible to set the output voltage Vref at a specific level through changing the ratio of the resistivities (R1/R0) independently from the temperature coefficient of the output voltage Vref. Further, it is possible to obtain a large temperature coefficient by subtracting the forward voltage Vf of the diode 132 from the output voltage. It is possible to obtain an arbitrary output voltage Vref and an arbitrary temperature coefficient without increasing the number of the components.

In the first to seventh embodiments, the drive circuit is applied to the LED head in the electro-photography printer using the LEDs as the light source, and may be applicable to an organic LED head using organic LEDs as a light source. Further, the drive circuit may be applicable for driving an array of heating resistors disposed in a thermal printer, and an array of display units disposed in a display device.

The disclosure of Japanese Patent Application No. 2007-232849, filed on Sep. 7, 2007, and Japanese Patent Application No. 2007-232850, filed on Sep. 7, 2007, is incorporated in the application by reference.

While the invention has been explained with reference to the specific embodiments of the invention, the explanation is illustrative and the invention is limited only by the appended claims.

What is claimed is:

1. A reference voltage generation circuit for outputting a reference voltage from an input voltage, comprising:
   a specific voltage output unit for outputting a specific voltage from the input voltage;
   a first temperature compensation circuit section including a first circuit section for outputting a voltage with a positive temperature property from the specific voltage output from the specific voltage output unit, and a second circuit section for setting a level of the voltage output from the first circuit section; and
   a second temperature compensation circuit section including a third circuit section for outputting the reference voltage with a positive temperature property from an output voltage output from the first temperature compensation circuit section, and a fourth circuit section for setting a level of the reference voltage output from the third circuit section.

2. A drive circuit for driving a light emitting element according to the reference voltage, comprising the reference voltage generation circuit according to claim 1.

3. A print head comprising the drive circuit according to claim 2.

4. A reference voltage generation circuit for outputting a reference voltage from an input voltage to a drive circuit of a light emitting element with light emission power having a negative temperature property so that the negative temperature property of the light emitting element is compensated, comprising;
   a regulator circuit having a first terminal for inputting the input voltage, a second terminal as an output terminal for outputting a specific voltage, and a third terminal;
   a resistor element having a fourth terminal connected to the second terminal and a fifth terminal connected to the third terminal for outputting the reference voltage through the resistor element; and
   a temperature compensation resistor element connected to the fifth terminal so that the resistor element and the temperature compensation resistor element divide the reference voltage to be applied to the third terminal, said temperature compensation resistor element having a resistivity with a positive temperature coefficient so that the resistivity of the temperature compensation resistor element increases substantially linearly with a temperature increase.

5. The reference voltage generation circuit according to claim 4, further comprising a diode element disposed between the second terminal and the fourth terminal.

6. The drive circuit for driving the light emitting element according to the reference voltage, comprising the reference voltage generation circuit according to claim 4.

7. A print head comprising the drive circuit according to claim 6.

8. A drive circuit for driving a light emitting element according to a reference voltage, comprising a reference voltage generation circuit for outputting the reference voltage from an input voltage to the drive circuit of the light emitting element with light emission power having a negative temperature property so that the negative temperature property of the light emitting element is compensated,
   wherein said reference voltage generation circuit includes:
      a regulator circuit having a first terminal for inputting the input voltage, a second terminal as an output terminal for outputting a specific voltage, and a third terminal;
      a temperature compensation transistor having a collector terminal connected to the second terminal, an emitter terminal for outputting the reference voltage, and a base terminal, said temperature compensation transistor being connected to the regulator circuit in series;
      a first resistor element disposed between the collector terminal and the base terminal; and
      a second resistor element disposed between the emitter terminal and the base terminal.

9. A print head comprising the drive circuit according to claim 8.

10. The drive circuit according to claim 8, wherein said regulator circuit has the third terminal connected to ground.

11. The drive circuit according to claim 8, further comprising a third resistor element and a fourth resistor element both connected to the emitter terminal in series so that the reference voltage is output between the third resistor element and the fourth resistor element.

12. The drive circuit according to claim 8, further comprising a temperature compensation diode connected to the emitter terminal so that the reference voltage is output through the temperature compensation diode.

13. A drive circuit for driving a light emitting element according to a reference voltage, comprising a reference voltage generation circuit for outputting the reference voltage from an input voltage to the drive circuit of the light emitting element with light emission power having a negative temperature property so that the negative temperature property of the light emitting element is compensated,
   wherein said reference voltage generation circuit includes:
      a regulator circuit having a first terminal for inputting the input voltage, a second terminal for outputting a specific voltage, and a third terminal;
      first temperature compensation diode having a fourth terminal connected to the second terminal and a fifth terminal for outputting the reference voltage;
      a first resistor element connected to the fifth terminal;
      a second resistor element connected to the first resistor element so that the third terminal is connected between the first resistor element and the second resistor element and the reference voltage output from the first temperature compensation diode is divided and applied to the third terminal;
      a second temperature compensation diode having a sixth terminal connected to the fifth terminal and a seventh terminal for outputting the reference voltage; and
      a third resistor element connected to the seventh terminal.

14. A print head comprising the drive circuit according to claim 13.

15. A reference voltage generation circuit for outputting a reference voltage from an input voltage to a drive circuit of a light emitting element with light emission power having a negative temperature property so that the negative temperature property of the light emitting element is compensated, comprising:
   a constant current diode element having a first terminal for inputting the input voltage and a second terminal for outputting the reference voltage; and
   a temperature compensation resistor element connected to the second terminal so that the reference voltage is output from between the temperature compensation resistor element and the second terminal, said temperature compensation resistor element having a resistivity with a positive temperature coefficient so that the resistivity of the temperature compensation resistor element increases substantially linearly with a temperature increase.

16. The drive circuit for driving the light emitting element according to the reference voltage, comprising the reference voltage generation circuit according to claim 15.

17. A print head comprising the drive circuit according to claim 16.

* * * * *